United States Patent [19]

Payne

[11] Patent Number: 4,499,368
[45] Date of Patent: Feb. 12, 1985

[54] UTENSIL REMOVAL DETECTION SYSTEM FOR COOKING APPLIANCE

[75] Inventor: Thomas R. Payne, Louisville, Ky.

[73] Assignee: General Electric Company, Louisville, Ky.

[21] Appl. No.: 586,053

[22] Filed: Mar. 5, 1984

[51] Int. Cl.³ .............................................. H05B 1/02
[52] U.S. Cl. .................... 219/452; 219/450; 219/453; 219/432; 219/489; 219/492; 219/494; 219/518
[58] Field of Search ............... 219/432, 433, 434, 445, 219/446, 447, 448, 449, 450, 451, 452, 453, 456, 459, 478, 489, 492, 494, 518

[56] References Cited

U.S. PATENT DOCUMENTS

| | | | |
|---|---|---|---|
| 3,153,139 | 10/1964 | Sivacek | 219/450 |
| 3,384,735 | 5/1968 | Linger | 219/456 |
| 4,164,645 | 8/1979 | Dogliotti | 219/452 |
| 4,214,150 | 7/1980 | Cunningham | 219/452 |
| 4,241,289 | 12/1980 | Bowling | 219/450 |
| 4,334,145 | 6/1982 | Norris, Sr. | 219/453 |
| 4,351,996 | 9/1982 | Kondo | 219/518 X |
| 4,394,565 | 7/1983 | Dills | 219/452 |

Primary Examiner—Volodymyr Y. Mayewsky
Attorney, Agent, or Firm—H. Neil Houser; Radford M. Reams

[57] ABSTRACT

A utensil removal detection arrangement for a cooking appliance incorporating an automatic surface unit. The duration of time intervals during which the sensed utensil temperature for a turned-on surface unit is less than a threshold temperature is measured. If such a time interval exceeds a predetermined time limit, the surface unit is de-energized and a user discernible signal is generated indicating to the user that no utensil is present on the surface unit.

8 Claims, 21 Drawing Figures

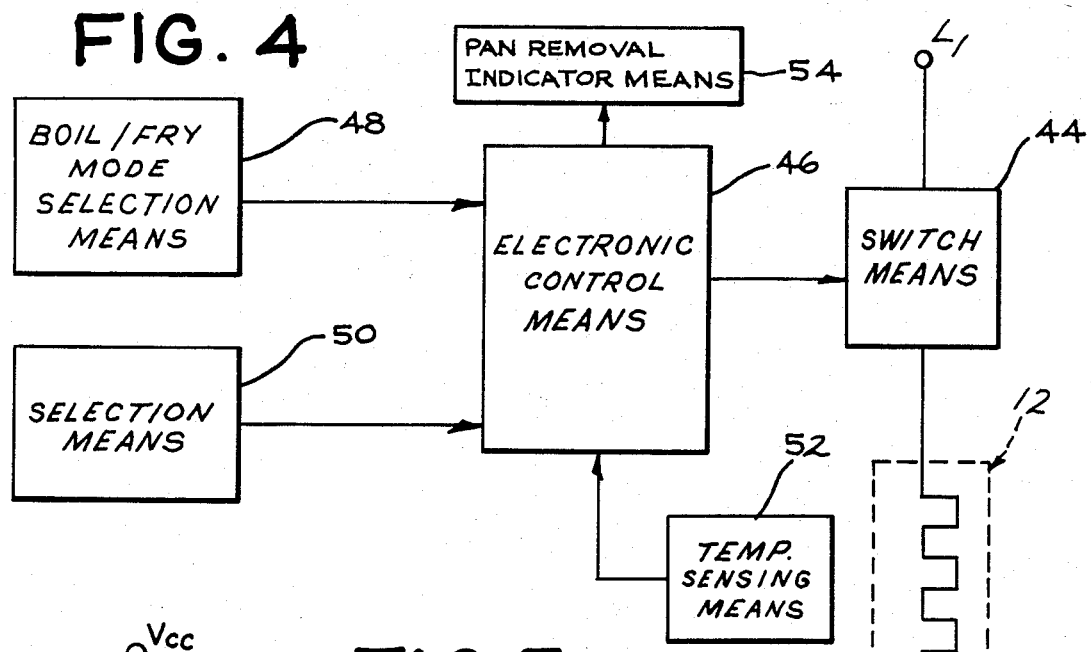
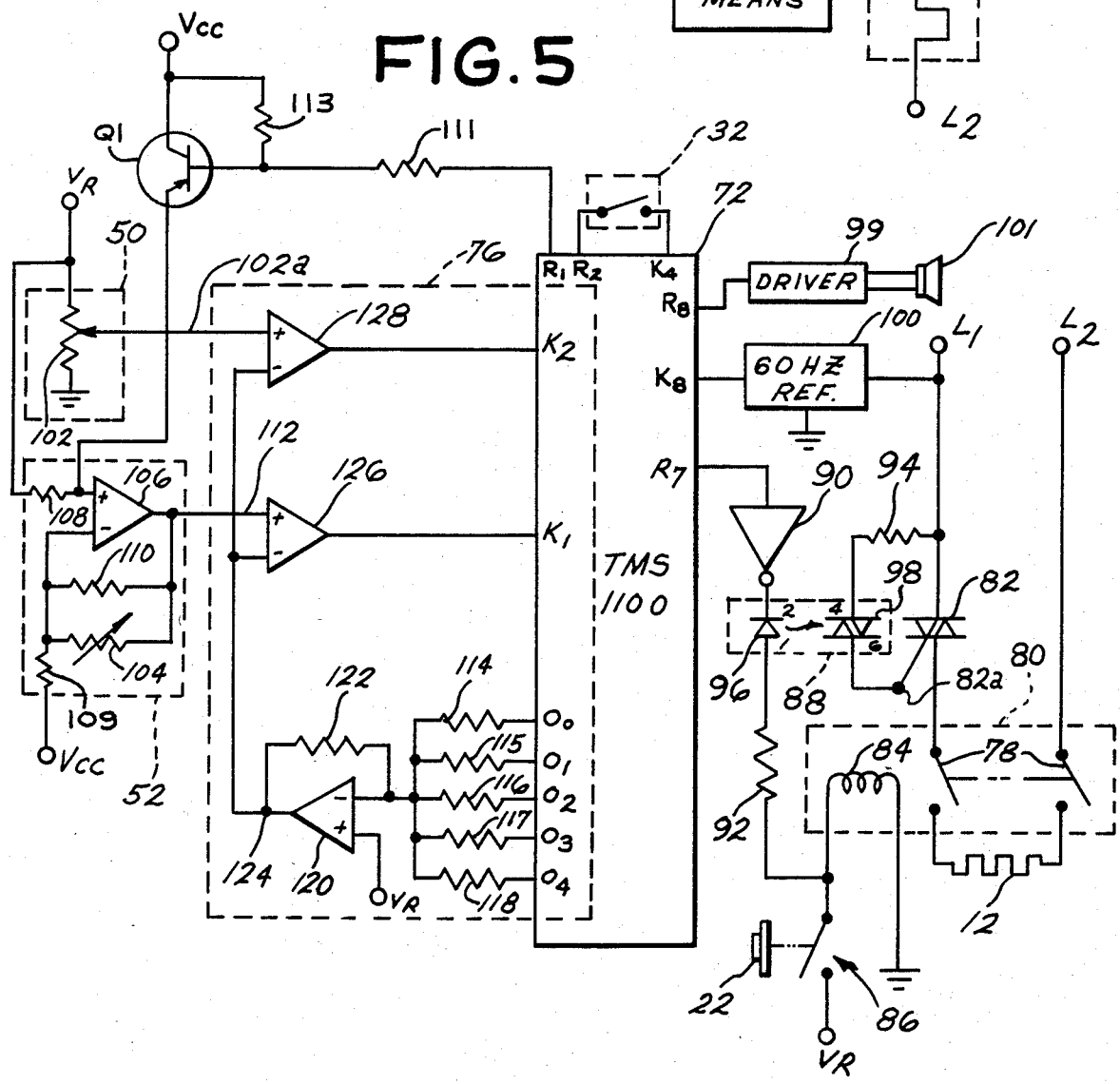

UTENSIL REMOVAL DETECTION SYSTEM FOR COOKING APPLIANCE

CROSS-REFERENCE TO RELATED APPLICATION

This application relates to commonly assigned copending application Ser. No. 586,052, "Automatic Surface Control Arrangement," filed in the name of Thomas R. Payne and David A. Schneider the specification of which is hereby incorporated by reference.

BACKGROUND OF THE INVENTION

This invention relates generally to cooking appliances such as domestic ranges incorporating surface heating units, and more particularly to a detection arrangement for detecting that a surface unit is turned on with no cooking utensil in place on the surface unit. It is well known that users of electric ranges and cooktops waste electrical energy by reason of the fact that the user often does not immediately turn the control switch to OFF after removal of the cooking utensil from the heating element or may on occasion leave unattended a cooking utensil inadvertently placed on an element other than the one switched on. A number of prior art patents disclose means to detect either the presence or absence of a cooking utensil on a heating element and provide an arrangement for terminating electrical power for de-energizing the heating element in the event the cooking utensil is absent. Examples of such arrangements may be found in U.S. Pat. Nos. 4,214,150; 4,394,565; and 4,334,145. Each of these examples disclose detection arrangements involving mechanical switches activated by the placement of a utensil on the heating element, the state of the switch indicating, in effect, the presence or absence of a utensil from the heating element. Such devices work satisfactorily; however, the additional mechanical structure required by such devices significantly adds to the cost of manufacture of appliances incorporating such structures. It would be desirable to provide a pan removal detection arrangement which requires no additional mechanical structure.

It is therefore an object of the present invention to provide a pan removal detection arrangement for an electronically controlled cooking appliance of the type incorporating at least one automatic surface unit having a temperature sensor for power control purposes, which detection arrangement requires no additional mechanical structure but rather uses the temperature information derived from the temperature sensor in the automatic surface unit to detect the presence or absence of a utensil from the surface unit.

It is a further object of the present invention to provide a utensil removal detection arrangement of the foregoing type which upon detection automatically de-energizes the surface unit and provides a user discernible warning signal to alert the user of the occurrence of a utensil removal condition.

SUMMARY OF THE INVENTION

According to one aspect of this invention, there is provided a utensil removal detection arrangement for a cooking appliance of the type having at least one surface unit for heating a utensil placed thereon, which arrangement includes temperature sensing means for sensing the temperature of a utensil placed on the surface unit; means responsive to the temperature sensor to detect a sensed utensil temperature greater than a predetermined reference temperature; a clock or timer responsive to the temperature detecting means operative to measure the duration of time intervals during which the sensed utensil temperature is less than the reference temperature; means responsive to the clock means for detecting time intervals of duration greater than the predetermined reference duration indicating that a time greater than the predetermined time is required to return the sensed utensil temperature to a level greater than the reference temperature; and means operative to de-energize the surface unit upon detection of time intervals of duration greater than the reference duration. The reference temperature and time duration values are selected such that when a utensil is present on the selected surface unit, the sensed utensil temperature will be raised to a temperature level greater than the reference temperature within a time less than the predetermined reference interval. The failure of the sensed utensil temperature to rise above the reference within that time period signifies that no utensil is present on the surface unit. Upon detecting that a utensil is not present on the surface unit electrical power to the surface unit is terminated and the a user discernible signal is generated, such as by an annunciator, to alert the user to the fact that no utensil is present on a turned on heating element.

BRIEF DESCRIPTION OF THE DRAWINGS

FIG. 4 is a greatly simplified functional block diagram of the control arrangement employed in the range of FIG. 1 incorporating the power control arrangement of the present invention;

FIG. 5 is a simplified schematic diagram of a control circuit illustratively embodying the power control arrangement of the present invention as embodied in the range of FIG. 1;

DETAILED DESCRIPTION OF THE ILLUSTRATIVE EMBODIMENT

A. Overview

Figure 1:
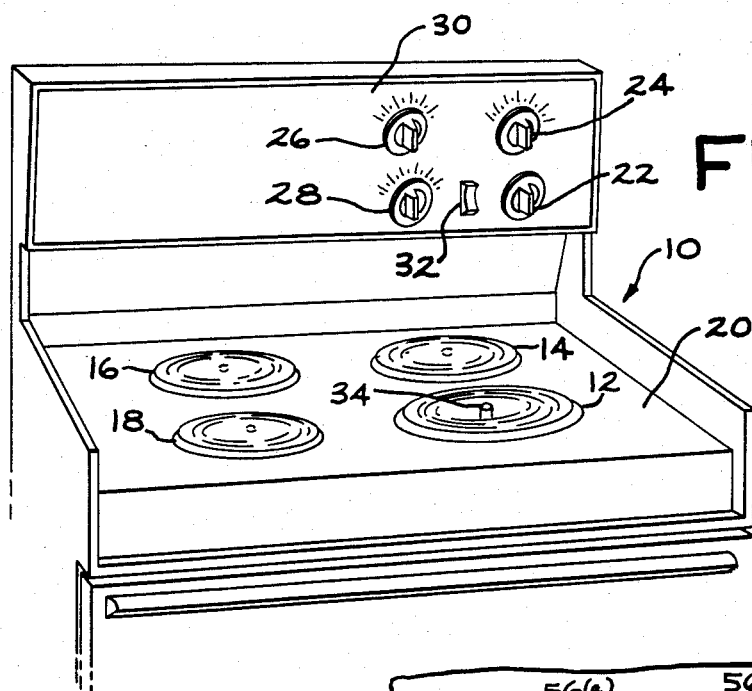
FIG. 1 is a front perspective view of a portion of an electric range illustratively embodying the power control arrangement of the present invention.

FIG. 1 illustrates an electric range 10 incorporating a control arrangement illustratively embodying the utensil removal detection arrangement of the present invention. Range 10 includes four conventional electric surface unit resistive heating elements 12, 14, 16 and 18 supported from a substantially horizontal support surface 20. Each of elements 12-18 are adapted to support cooking utensils, such as frying pans, sauce pans, tea kettles, etc., placed thereon for heating. Manually operable rotary control knobs 22, 24, 26 and 28 are mounted to control panel 30. Control knobs 24, 26 and 28 enable the user to select the desired power level for heating elements 14, 16 and 18, respectively in a conventional manner. Heating element 12 is arranged to function as an automatic surface unit, that is, energization of element 12 is controlled as a function of the temperature of the utensil being heated thereon. It is common practice to provide only one automatic surface unit in a multiple unit range or cooktop. However, multiple automatic surface units could be provided.

Figure 2:
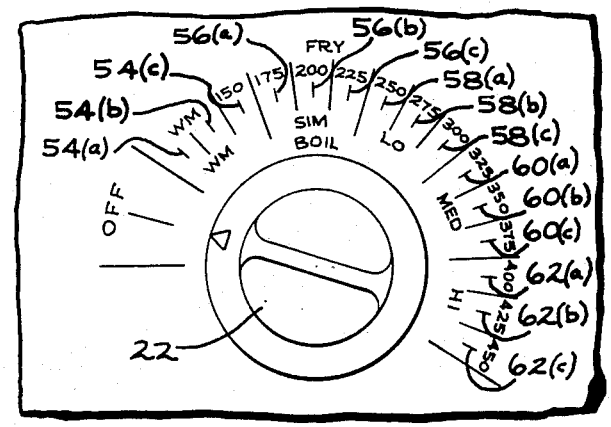
FIG. 2 is a greatly enlarged view of a portion of the control panel of the range of FIG. 1 showing the details of one of the control knobs thereof.

The sensed utensil temperature sensed by temperature sensing device 34 is used in implementing a plurality of operating modes for element 12 including a Fry Mode and a general Boil Mode. The general Boil Mode comprises several actual Boil Modes, a Warm mode and a Simmer Mode. Mode selection switch 32 on control panel 30 enables the user to select the Fry Mode or the general Boil Mode for heating element 12. As best seen in FIG. 2, control knob 22 enables the user to select a plurality of heat settings for the Fry Mode and for the general Boil Mode, Warm, Simmer and the actual Lo, Med and Hi Boil Modes, and to select from a plurality of heat settings within each of these modes as well.

Figure 3B:
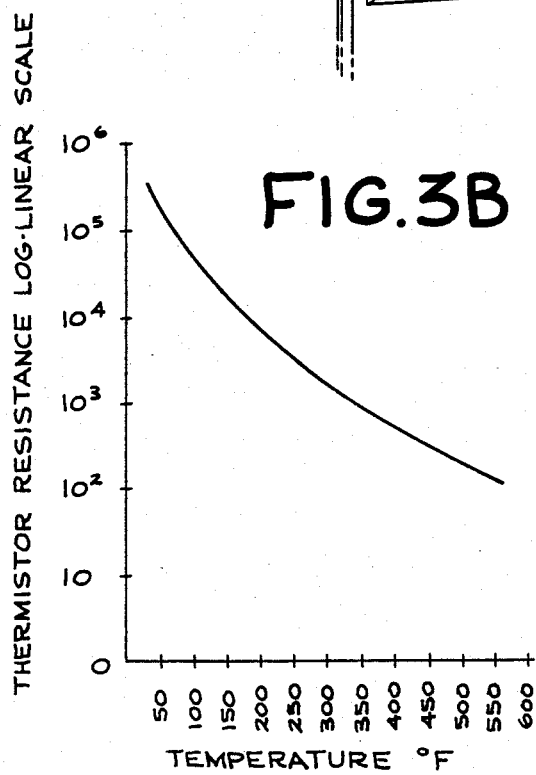
FIG. 3B is a graphic representation of the resistance versus temperature characteristic for the temperature sensor of FIG. 3A.
Figure 3A:
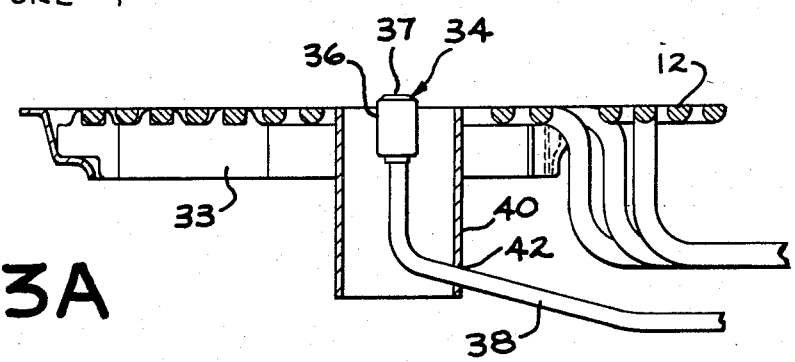
FIG. 3A is a sectional side view of a surface unit of the type incorporated in the range of FIG. 1 showing the temperature sensor.

The utensil temperature sensing arrangement employed in the illustrative embodiment will now be described with reference to FIG. 3A. Surface unit heating element 12 is supported on spider arms 33. The temperature sensor apparatus designated generally 34 includes a housing 36 mounted on one end of an elongated, generally L-shaped tubular arm 38.

A cylindrical shield 40 of low thermal mass metal forms the central core to which the radial spider arms 33 are attached and also serves to shield sensor housing 64 from radiated heat from heating element 12. Arm 38 extends through a slot 42 in shield 40, and bears against the upper end of the slot to hold housing 36 in the proper position slightly above the element 12 so as to cause the uppermost surface 37 of housing 36 to resiliently contact the bottom of a cooking utensil when it is placed on heating element 12. The temperature sensitive element (not shown) of the sensor contained within housing 36 is a conventional negative temperature coefficient thermistor having a resistance vs temperature characteristic as shown in FIG. 3B. The structural details of this sensor arrangement do not form any part of the subject invention and are thus described only to the extent necessary for an understanding of the present invention. Such devices are described in greater detail in commonly assigned U.S. Pat. No. 4,241,289, the disclosure of which is hereby incorporated by reference.

A generalized functional block diagram of the power control arrangement for heating element 12 of range 10 is shown in FIG. 4 wherein heating element 12 is energized by a standard 60 Hz AC power signal which can be either 120 or 240 volts supplied to terminals L1 and L2. Power to element 12 is controlled by switch means 44 connected in series with element 12. Switch means 44 is switched into and out of conduction by control signals generated by electronic control means 46.

Electronic control means 46 generates power control signals in response to inputs from the user operable input selection means comprising Boil/Fry Mode selection means 48 and heat setting selection means 50, and inputs from temperature sensing means 52 which senses the temperature of the utensil being heated by element 12. The output of Boil/Fry Mode selection means 48 represents the state of mode selection switch 32 (FIG. 1) indicating to control means 46 whether the general Boil or Fry Mode has been selected. The output of heat setting selector means 50 represents the heat setting selected by the user by manipulation of control knob 22 (FIGS. 1,2). Pan Removal Indicator Means 54 generates a user discernible warning signal when triggered by control means 46 to alert the user to the occurrence of a "pan removal" condition.

In the illustrative embodiment, electronic control means 46 controls the power level applied to heating element 12 by controlling the duty cycle of heating element 12, i.e., the percentage of time power is applied to heating element 12. A predetermined control period comprising a fixed number of control intervals is employed as the time base for power control. The ratio of conductive control intervals to the total number of control intervals in the control period, expressed as a percentage, is hereinafter referred to as the duty cycle. Preferably each control interval comprises eight full cycles of the standard 60 Hz 240 volt AC power signal corresponding to a time period of approximately 133 milliseconds. Each control period comprises 32 control intervals corresponding to time period of approximately 4 seconds. The duration for the control interval and control period selected provide a satisfactory range of heat settings for desired cooking performance and can be programmed to make efficient use of microprocessor memory. It is understood, however, that control intervals and control periods of greater and lesser duration could be similarly employed.

Electronic control means 46 selectively implements one of sixteen different duty cycle power levels, including a zero duty cycle or OFF level. Table I shows the percentage ON time, i.e. the duty cycle and the number of conductive control intervals per control period for each of sixteen available power levels.

TABLE I

| Power Level | % On Time | On Control Intervals Per Control Period | Hex Rep M (KB) |
|---|---|---|---|
| OFF | 0 | 0 | 0 |
| 1 | 3 | 1 | 1 |
| 2 | 6.5 | 2 | 2 |
| 3 | 9 | 3 | 3 |
| 4 | 12.5 | 4 | 4 |
| 5 | 16 | 5 | 5 |
| 6 | 22 | 7 | 6 |
| 7 | 25 | 8 | 7 |
| 8 | 31.5 | 10 | 8 |
| 9 | 37.5 | 12 | 9 |
| 10 | 44 | 14 | A |
| 11 | 50 | 16 | B |
| 12 | 62.5 | 20 | C |
| 13 | 75 | 24 | D |
| 14 | 87.5 | 28 | E |
| 15 | 100 | 32 | F |

As shown in Table II, each heat setting has associated with it a predetermined minimum steady state temperature, and steady state power level. The steady state power level associated with each heat setting is the heat setting which under most operating conditions delivers sufficient energy to the load to hold the sensed utensil temperature in the desired steady state range with relatively little temperature excursion above or below this range.

TABLE II

| | Fry Mode | | | Boil Mode | | |
|---|---|---|---|---|---|---|
| Hexadecimal Representation of Setting (KB) | Selected Heat Setting | Steady State Utensil Temp. Range °F. | Steady State Power Level | Selected Heat Setting | Steady State Utensil Temp. Range °F. | Steady State Power Level |
| 0 | OFF | — | 0 | OFF | — | 0 |
| 1 | Wm(1) | 0-121 | 3 | Wm(1) | 0-121 | 3 |
| 2 | Wm(2) | 121-146 | 3 | Wm(2) | 121-146 | 3 |
| 3 | 150 | 147-166 | 5 | Wm(3) | 147-166 | 4 |
| 4 | 175 | 167-197 | 6 | Sim(1) | 198-219 | 4 |
| 5 | 200 | 198-219 | 7 | Sim(2) | 198-219 | 5 |
| 6 | 225 | 220-240 | 8 | Sim(3) | 198-219 | 6 |
| 7 | 250 | 241-268 | 8 | Lo(1) | 220- | 8 |
| 8 | 275 | 269-286 | 9 | Lo(2) | 220- | 9 |
| 9 | 300 | 287-315 | A | Lo(3) | 220- | A |
| A | 325 | 316-335 | B | Med(1) | 220- | B |
| B | 350 | 336-359 | B | Med(2) | 220- | B |
| C | 375 | 360-386 | C | Med(3) | 220- | C |
| D | 400 | 387-422 | D | Hi(1) | 220- | D |
| E | 425 | 423-443 | D | Hi(2) | 220- | E |
| F | 450 | 444-472 | D | Hi(3) | 220- | E |

A. (1) FRY Mode

The Fry Mode is intended to rapidly bring the temperature of the utensil to the selected relatively narrow operating temperature range while avoiding extensive temperature overshoots and undershoots which can adversely affect cooking performance. In the Fry Mode relatively tight control over the steady state operating temperature of the heating element is desired in the heating of a wide variety of food loads. To this end a relatively narrow steady state temperature range is provided for each of the Fry Mode heat settings.

In implementing the Fry Mode in response to an increase in heat setting, either from OFF or from a previously selected heat setting, the heating element is operated at a transient power level determined by the electronic control means as a function of the difference between the steady state temperature range and the sensed utensil temperature when the sensed utensil temperature is less than the steady state temperature range for the selected heat setting. The power level applied to the heating element exceeds the steady state power level for the selected heat setting by a number of power levels, which number of levels is a function of the difference between the sensed utensil temperature and the steady state temperature range for the selected heat setting. As this temperature difference approaches zero, the applied power level approaches the steady state level. By operating the heating element at relatively high power levels when the difference between the sensed temperature and the desired temperature range is large, the utensil temperature initially increases rapidly. By operating the heating element at power levels which decrease toward the steady state level as the sensed temperature increases toward the desired temperature range, the desired relatively rapid thermal response is achieved while avoiding the substantial temperature overshoots and undershoots which are typical of the so-called "bang-bang" or linear feedback approaches in which the power is either full on or full off, depending upon the error.

As briefly hereinbefore described, in the Fry Mode each heat setting has associated with it a steady state duty cycle or power level which is intended to maintain typically loaded cooking utensils within the corresponding steady state temperature range following the transient period during which the utensil is initially heated to its steady state level. When the sensed utensil temperature exceeds the steady state temperature range the heating element is de-energized. If the sensed utensil temperature decreases below the steady state temperature range, the power level applied to the heating element is adjusted upwardly as a function of the temperature difference just as hereinbefore described with reference to the transient heat-up period.

The Fry Mode also enables the user to select the WARM levels designated Wm(1) and Wm(2). In response to these selections, the heating element is energized just as in the Warm Operating Mode hereinafter described with reference to the general Boil Mode.

A. (2) General Boil Mode

The General Boil Mode is selected via mode switch 32. Within this General Boil Mode, the user is further able to select the Warm, Simmer and actual Boil Mode, the latter being further divided into Lo, Med and Hi modes.

A. (3) Warm Mode

The purpose of the Warm Mode is to enable the user to warm food quickly to a predetermined relative low temperature substantially less than the boiling point of water. This mode is particularly advantageous when warming milk, as the predetermined temperature is selected such that the milk may be warmed without risk of scalding, even if left unattended. Referring again to Table II, the Warm Mode has associated with it three heat settings, designated Wm(1), Wm(2) and Wm(3) corresponding to selection marks 54(a), 54(b) and 54(c) for control knob 22. Heat setting Wm(1) has maximum temperature limit of 120° F. Heat settings Wm(2) and Wm(3) have associated therewith steady state temperature ranges 121°–146° F. and 147°–167° F., respectively. Selection of heat setting Wm(1) causes heating element 12 to be operated at power level 3 whenever the sensed utensil temperature is less than 121° F. and de-energized when the sensed utensil temperature exceeds 121° F. For settings Wm(2) and Wm(3), heating element 12 is operated at power level 6 corresponding to a 22% duty cycle when the sensed utensil temperature is less than the minimum threshold temperature of 121° F. In order to rapidly bring the utensil temperature to its desired temperature, it has been empirically determined that for heating element 12 this is the maximum duty cycle which can be applied without risk of scorching food in the utensil. When the sensed utensil temperature is within the steady state range for settings Wm (1), Wm(2) and Wm(3), heating element 12 is operated at the steady state power levels 3, 3 and 4, respectively. If the sensed utensil temperature rises above the upper threshold temperature for the selected setting, the heating element is de-energized until the sensed temperature cools to lower than the upper threshold temperature. Should the temperature fall below the desired range power level 6 is again implemented until the sensed temperature falls within the desired temperature range. The three heat settings in this mode enable the user to select the proper heat setting for the size of the food load being warmed.

A. (4) Simmer Mode

The Simmer Mode enables the user to heat food rapidly to a temperature closely approaching but not exceeding the boiling point of water (212° F.) and then to hold the temperature of the food at this level without boiling when left unattended.

There are three heat settings for the Simmer Mode designated in Table II as Sim(1), Sim(2) and Sim(3), which correspond to selection marks designated 56(a), (b) and (c) for control knob 22 (FIG. 2). The steady state temperature range for all three settings is 198°–220° F. This range for the sensed utensil temperature assures that the contents of the utensil will be near the boiling point of water (212° F.) but will not be hot enough to actually boil. It has been empirically determined that the sensed utensil temperature is typically on the order of 15° F. degrees hotter than the contents of the utensil. This is believed due at least in part to the fact that the sensor senses the external surface of the utensil, which surface is in direct contact with the heating element. The external utensil surface temperature is higher than the contents of the utensil due in part to heat losses in the utensil itself, and inefficiencies in heat transfer from the utensil to the food load. Selected temperature limits have been empirically determined to work satisfactorily for the heating element of the illustrative embodiment. These limits are illustrative only and not intended to be limiting. It is to be understood that for other heating elements or temperature sensing arrangements other temperature limits may provide better performance.

In order to rapidly bring the contents of the utensil to the desired simmer temperature for a variety of food load sizes and maintain that temperature efficiently, each of the three heat settings has a different steady state power level associated with it as shown in Table II. In order to rapidly reach the steady state temperature range with minimal overshoot, the electronic control means is operative in the Simmer Mode to operate the heating element at a predetermined relatively high power level when the sensed utensil temperature is less than a predetermined minimum simmer reference temperature. In the illustrative embodiment, the high power level is level 15 (100% duty cycle) and the threshold temperature is 121° F. For sensed utensil temperatures between the minimum reference temperature and a predetermined intermediate simmer reference temperature the heating element is operated at a predetermined intermediate power level. In the illustrative embodiment the intermediate reference temperature is 198° F. and the intermediate power level is power level 8 (31.5% duty cycle). For sensed utensil temperatures between the intermediate reference temperature and a predetermined maximum simmer reference temperature, the heating element is operated at the steady state power level associated with the selected heat setting. In the illustrative embodiment, the predetermined maximum simmer reference temperature is 220° F. The steady state power levels for Sim(1), Sim(2) and Sim(3) are 4, 5 and 6, respectively (12.5%, 16% and 22% duty cycle, respectively). The minimum, intermediate and maximum reference temperatures are selected to rapidly bring the temperature of the contents of the utensil to near its boiling point without boiling and to hold the controls near the boiling point without boiling.

After the sensed utensil temperature reaches the steady state temperature range, if the sensed temperature exceeds 220° F., the heating element is de-energized, i.e. power level 0 is applied. If the sensed utensil temperature drops below 198° F., power level 8 (37.5% duty cycle) is applied. When the sensed utensil temperature is within the 198°–220° F. range, the applied power level is that associated with the selected heat setting, i.e. level 4, 5 or 6 (Table II). This enables the user to select a duty cycle which will sufficiently heat the contents of the utensil to provide the desired simmer rate for the size of the load being heated while being assured that the sensed utensil temperature will remain within a relatively narrow temperature band set sufficiently low to prevent boiling.

A. (5) Actual Boil Mode

The operating mode broadly referred to as the general Boil Mode includes in addition to the hereinbefore described Warm and Simmer Modes, three actual boil modes, that is three modes for controlling the actual boiling of water loads contained in utensils placed on heating element 12. These modes are designated Lo, Med, and Hi Modes. Each of these modes has three heat settings corresponding to selection marks 58(a)–(c), 60(a)–(c) and 62(a)–(c) for Lo, Med and Hi Boil Modes, respectively for control knob 22 (FIG. 2); hence, in the illustrative embodiment the user can select from a total of 9 heat settings for boiling water loads on heating element 12. The steady state power level for each heat setting is shown in Table II.

These nine heat settings enable the user to select the steady state power level or duty cycle which will provide the desired boiling rate from low to high for particular utensil size and volume of water being heated.

Rapid thermal response to selection of the boil mode, particularly when the surface unit is initially at room temperature, is achieved by operating the heating element at full power (power level 15, 100% duty cycle) when the sensed utensil temperature is less than a predetermined reference temperature. Because of the isothermal nature of the boiling water, thermal overshoot is of little concern. Hence a relatively high minimum boil reference temperature may be selected which allows the water in the utensil to closely approach its boiling point (212° F.) even though the element is being overdriven at full power, thereby enhancing the speed of response. However, the sensed temperature of the water and hence the second utensil temperature will not increase appreciably once the water load begins boiling. If boiling begins before the reference temperature is reached, the reference temperature will likely not be exceeded in which case maximum power would be applied to the heating element continuously, resulting in a highly energy inefficient operation. Therefore, it is critical that the minimum boil reference temperature be set sufficiently low to insure that it is sensed before boiling actually begins.

It has been empirically determined that a sensed utensil temperature of 220° F. brings the utensil contents sufficiently close to the boiling point to insure that the thermal inertia of the heating element will be sufficient to bring the contents of the utensil to its the boiling point and yet can be reliably sensed before the contents of the utensil begins to boil by the sensing arrangement of the illustrative embodiment. Hence, in the illustrative embodiment the minimum boil reference temperature is selected to be 220° F. When the sensed utensil temperature is less than 220° F., power level 15 is applied. When the sensed utensil temperature exceeds 220° F., the steady state power level associated with the selected heat setting is applied. This enables the user to vary the boiling rate and to achieve the desired boiling rate for various size water loads without employing a power level substantially higher than necessary thereby enhancing the energy efficiency of the appliance.

B. Utensil Removal Detection Arrangement

It will be recalled that an objective of the present invention is to provide means for detecting a "utensil removal" condition. A utensil removal condition exists whenever a surface unit is turned on but no utensil is in place on that surface unit, such as can occur as a result of inadvertently placing a utensil on a surface unit other than the surface unit selected for energization by the user, or failure to turn the surface unit off after removing the utensil.

The utensil removal detection arrangement in accordance with the present invention relies upon the empirical observation that when no utensil is present on the surface unit, the temperature sensor responds primarily to the temperature of the air in the vicinity of the sensor. This air temperature is substantially cooler than the temperature of the bottom of a utensil would be when the surface unit is operated at the same duty cycle. Consequently, when a utensil which has reached steady state temperature is removed without turning off the surface unit the temperature sensed by the sensor will decrease. This is true even in operating modes such as the Actual Boil Mode hereinbefore described in which full power is applied when the sensed temperature is less than a predetermined level. The sensed temperature will drop to a steady state level substantially less than the minimum steady state temperature normally desired for cooking or boiling purposes. In fact, under normal conditions, the sensed utensil temperature will be substantially less than it would be in the presence of a utensil under any of the normally provided heat settings or duty cycles generally provided for domestic range and cooktop surface units once steady state conditions are achieved.

In accordance with the present invention, the utensil temperature is monitored to determine whether the sensed temperature is greater or less than a predetermined reference temperature. This reference temperature is selected to be sufficiently low that it will eventually be reached for all available cycle selections when a utensil is present on the surface unit and sufficiently high to insure that it will not be reached at any of the available duty cycle selections when a utensil is not present on the surface unit. A reference time is selected which is sufficiently long to insure that the utensil temperature will rise to the reference temperature for the available duty cycles when a utensil is present on the surface unit. Hence, when the sensed temperature remains below the reference temperature for a time period greater than the reference time, this signifies that no utensil is present on the surface unit, i.e. a utensil or pan removal condition exists. Timing means are provided to measure the duration of time intervals in which the sensed temperature is less than the reference temperature. Upon detection of a time interval of duration greater than the reference time, the surface unit is de-energized and indicator means are triggered to generate a warning signal to alert the user to the existence of the utensil removal condition.

Of course there are transient circumstances in which large temperature differences are expected to occur between the actual sensed utensil temperature and the desired steady state utensil temperature for the selected heat setting for the surface unit. For example, when a utensil is heating up following turning on the surface unit or changing to a higher heat setting, the sensed utensil temperature is initially substantially less than the desired steady state temperature. Similarly, after reaching steady state operating temperature, the user may lower the sensed utensil temperature below the desired steady state temperature by the addition of material to the utensil such as cold water or by changing utensils. In the case of initial heat-up, a relatively long-time period may be required under normal circumstances to bring the surface unit and utensil from room temperature to the desired steady state operating temperature. In the latter situation, the time required to return the sensed utensil temperature to its steady state level may be substantially less because the surface unit is already hot.

Since a shorter recovery time is required when the sensed temperature decrease is due to a change in the load rather than an initial heat-up situation, two reference times are utilized in accordance with one aspect of the present invention, a first relatively long reference time which is used as a reference time during heat-up operation and a second relatively short reference time which is used when the sensed temperature drops below the reference temperature after having once risen above the reference temperature.

In the illustrative embodiment, the time interval selected for a reference when in the heat-up phase is twenty minutes for the actual Boil and Fry Modes. This reference is based on the empirical observation that approximately ten minutes is required to heat a two liter test load of water from room temperature to its boiling point in the Boil Mode hereinbefore described. The reference is set at twice this time to provide a sufficient tolerance to insure that even in the case of an extremely large utensil load the reference temperature will be exceeded within the allotted time. The reference time period for the situation where the temperature has previously exceeded the reference has been somewhat arbitrarily selected to be ten minutes for the Fry Mode, and fifteen minutes for the Boil Mode. Reference times of fifteen minutes and ten minutes for the heat-up and interrupt reference values for Warm and Simmer Modes, respectively, have been found to provide satisfactory results. While the reference values employed in the illustrative embodiment have been shown to provide satisfactory results, it is understood that other time limits could be similarly employed to achieve suitable results.

While a single predetermined reference temperature value could be selected for all heat settings, better results are achieved by providing a reference temperature for each heat setting which temperature is related to the steady state duty cycle and desired steady state temperature for that heat setting. In the illustrative embodiment, the reference level employed is the minimum steady state temperature for the temperature range associated with each setting shown in Table II. This value is selected as it is the highest temperature level which is sure to be achieved in normal operation, i.e. operation with a utensil positioned on the heating element. This temperature will assuredly be reached in normal operation because for the power control arrangement herein described the heating element is operated in a transient mode, i.e. overdriven until this temperature is reached. This provides a reliable reference point for the further reason that it is less likely to be reached as a result of radiant energy from the heater with no pan present on the element than would lower temperature. However, it is to be understood that other reference levels could be similarly employed; for example, the reference level for each heat setting could be chosen to be the minimum temperature for the next lower heat setting.

In order to illustrate the manner of operation assume the Fry Mode and a heat setting of 325° F. are selected. As shown in Table II the reference temperature is 316° F. (KB=A). Hence, if after twenty minutes the sensed utensil temperature has not risen above 316° F. a utensil removal condition will be indicated. Similarly, for selection of the low Boil Mode the minimum reference temperature will be 220° F. Hence, following selection of the low Boil Mode if the sensed utensil temperature after 20 minutes remains less than 220° F., a utensil removal condition will be signified. If, again operating in the Boil Mode, after having begun boil at 220° the user adds some additional cold water to the load causing the sensed temperature to drop below the 220° level, the sensed utensil temperature will normally return to a level greater than 220° within a ten minute time period, and the surface unit will continue to operate in the Boil Mode. However, if, rather than adding cold water, the user removes the utensil and fails to turn off the surface unit, the sensed utensil temperature will also drop below the 220° reference level. If the surface unit is left unattended, the sensed utensil temperature will remain below the 220° reference level until expiration of the ten minute time period, at which time a utensil removal condition will be detected.

Upon detection of a utensil removal condition, the surface unit is de-energized and a user discernible warning signal is generated to alert the user to the detection of a utensil removal condition. The means for implementing this detection arrangement in the illustrative embodiment will be described hereinafter with reference to the microprocessor based control circuit and the control program stored in the ready only memory (ROM) of the microprocessor.

C. Microprocessor Implementation

C. (1) Control Circuit

A control circuit illustratively embodying a control arrangement implementing the hereinbefore described operating modes in accordance with the present invention is represented in simplified schematic form in FIG. 5. Electronic control means 46 of FIG. 4 is provided in the form of a microprocessor 72. Microprocessor 72 makes power control decisions for heating element 12 in response to input signals from input selection means comprising mode selection switch 32 and heat setting input means 50, and from temperature sensing means 52, in accordance with the control program stored in the Read Only Memory (ROM) of microprocessor to be hereinafter described.

Heating element 12 is connected across power lines L1 and L2 via normally open contacts 78 of ON/OFF relay 80 and power control triac 82. Power lines L1 and L2 are adapted for coupling to an external 60 Hz AC 120 or 240 volt typical domestic power supply. Coil 84 of ON/OFF relay 80 is serially connected between DC reference voltage supply $V_R$ and system ground via ON/OFF switch 86. Switch 86 is mechanically coupled in conventional manner schematically illustrated in phantom to control knob 22 (FIG. 2) such that switch 86 is in its open position when control knob 22 is in its OFF position. Movement of control knob 22 from its OFF position places switch 86 in its closed position energizing coil 84 which in turn closes contacts 78, thereby enabling power control triac 82 to control energization of element 12.

Microprocessor 72 controls the switching of power control triac 82 by trigger signals provided at output port R7. The signal at R7 is coupled to pin 2 of opto-isolator device 88 via inverting buffer amplifier 90. Pin 1 of opto-isolator 88 is coupled to dc reference voltage supply via current limiting resistor 92. The output return pin 4 of opto-isolator 88 is coupled to power line L2 via current limiting resistor 94. Pin 6 is coupled to the gate terminal 82a of power control triac 82 which is connected in series with heating element 12. A trigger signal at R7 is inverted by amplifier 90 forward biasing light emitting diode 96 of opto-isolator 88, which in turn switches the bipolar switch portion 98 of opto-isolator 88 into conduction, thereby applying a gate signal to power control triac 82 switching it into conduction.

Output port R8 of microprocessor 72 is coupled by conventional driver circuitry 99 to a conventional annunciator or tone generating device 101. Annunciator 101 provides an audible signal to the user when triggered by a signal at port R8.

A 60 Hz pulse train is generated by conventional zero crossing detector circuit 100 coupled between L1 and input port K8 of microprocessor to facilitate synchronization of control system operation with zero crossings of the 60 Hz AC power signal applied across L1 and L2.

User inputs are provided to microprocessor 72 via Boil/Fry Mode selection switch means 32 and heat setting selection means 50 comprising input potentiometer 102. Mode selection switch 32 is directly coupled between output port R2 and input port K4 of microprocessor 72. The open and closed states of switch 32 signify selection of the general Boil Mode and Fry Mode, respectively. Microprocessor 72 determines the state of switch 32 by periodically generating a logical high signal at R2 and monitoring the input signal at K4.

Input potentiometer 102 is coupled between regulated 10 volt dc reference voltage supply $V_R$ and system ground. Wiper arm 102a of potentiometer 102 is positioned by user rotation of control knob 22 (FIG. 2). The voltage between wiper arm 102a and system ground is an analog signal representing the selected heat setting.

Temperature sensing means 52 comprises thermistor device 104 connected between the output and inverting input of operational amplifier 106. The non-inverting input of amplifier 106 is coupled to the dc reference voltage supply $V_R$ via resistor 108. The inverting input of amplifier 106 is coupled to regulated dc supply Vcc via resistor 109. A linearizing resistor 110 is connected in parallel with thermistor 104. The value of resistor 110 is selected such that the equivalent resistance of the parallel combination of resistor 110 and thermistor 104 varies approximately linearly with the temperature sensed by thermistor 104. Resistor 109 couples regulated supply voltage Vcc to the inverting input of amplifier 106. By this arrangement the output voltage of amplifier 106 on line 112 is an approximately linear function of the temperature sensed by thermistor 104. The output voltage at line 112 has been found to represent the actual temperature of the outer surface of the utensil in contact with the sensor to an accuracy on the order of ±2°-3° F.

In order to prolong the life of thermistor 104, a disabling circuit comprising transistor Q1 and biasing resistors 111 and 113 is connected between output port R1 of microprocessor 72 and the non-inverting input of amplifier 106. Output port R1 is coupled to the base of transistor Q1 via resistor 111. Resistor 113 is connected between the collector and base of transistor Q1. The collector is also tied to supply voltage Vcc. The emitter of transistor Q1 is connected to the non-inverting input of amplifier 106. The function of this arrangement is to only pass current through thermistor 104 when temperature measurements are being made. To this end microprocessor 72 sets output R1 causing a positive voltage to be applied to the base of transistor Q1 via resistor 111. This switches transistor Q1 into conduction pulling the voltage at the inverting input of amplifier 106 to Vcc. This similarly pulls the output voltage of amplifier 106 to Vcc. As a result there is no voltage drop across thermistor 104 and hence no current flow therethrough.

When a temperature measurement is to be made, R1 is reset, turning off transistor Q1, thereby effectively switching the disabling circuit out of the sensing circuit.

The analog heat setting and utensil temperature signals from potentiometer 102 and temperature sensing circuit 52, respectively, are converted to digital form for input to microprocessor 72 by A/D conversion circuitry 76. A/D circuit 76 utilizes a five-bit binary weighted ladder resistor network comprising resistors 114, 115, 116, 117 and 118, operational amplifier 120 and feedback resistor 122 coupled between output 124 of amplifier 120 and its inverting input. Resistors 114–118 couple output ports $O_0$–$O_4$, respectively, to the inverting input of amplifier 120. Analog voltages corresponding to coded outputs generated by microprocessor 72 at output ports $O_0$–$O_4$ are generated at output 124 of amplifier 120. This output voltage is coupled to the inverting inputs of operational amplifiers 126 and 128. The non-inverting inputs of amplifiers 126 and 128 are connected to the output line 112 of temperature circuit 52 and wiper arm 102a of potentiometer 102, respectively. The outputs of amplifiers 126 and 128 are coupled to input ports K1 and K2, respectively, of microprocessor 72.

Microprocessor 72 samples the temperature output signal by generating a sequence of five-bit signals at output ports $O_0$–$O_4$, each signal representing a threshold temperature. Each five-bit signal is converted to an analog voltage level at output 124 of amplifier 120. Microprocessor 72 internally monitors the state of input port K1. The heat setting input is similarly obtained by monitoring input port K2 as a sequence of digital signals appears at $O_0$–$O_4$, representing the 16 available heat settings. The codes utilized for temperature and heat setting determination will be described in detail hereinafter in conjunction with the description of the control program and more specifically the User Input Scan and the Temp Scan routines for the control program.

The following component values are believed suitable for use in the circuit of FIG. 5. These values are exemplary only, and are not intended to limit the scope of the claimed invention.

| Fixed Resistors (Ω) | | | | Transistor Q1 | |
|---|---|---|---|---|---|
| 92 | 220 | 114 | 162K | 2H2222 | |
| 94 | 220 | 115 | 82K | Opto-Isolator | |
| 108 | 47K | 116 | 40K | 88 | MDC 3020 Integrated Circuit |
| 109 | 925 | 117 | 20K | Operational Amplifiers | |
| 110 | 1.69K | 118 | 10K | 90 | ULN 2004A Integrated Circuit |
| 111 | 4.7K | 122 | 9.3K | 106 | ⎫ |
| 113 | 10K | | | 120 | ⎬ LM 308 Integrated Circuit |
| Variable Resistor (Ω) | | | | 126 | ⎭ |
| 102 | 50K | | | 128 | |
| Thermistor (Ω) | | | | Microprocessor | |
| 104 | 100K | | | 72 | Texas Instruments TMS 1100 |
| | | | | Triac | |
| | | | | 82 | General Electric SC 147 |
| | | | | Surface Unit | |
| | | | | 12 | General Electric WB 30 × 218 |

B. (2) Control Program

Microprocessor 72 is customized to perform control functions in accordance with this invention by permanently configuring the Read Only Memory (ROM) of microprocessor 72 to implement predetermined control instructions. FIGS. 6 through 13B are flow diagrams which illustrate the control routines incorporated in the control program of microprocessor 72 to perform the control functions in accordance with the present invention. From these diagrams one of ordinary skill in the programming art can prepare a set of instructions for permanent storage in the ROM of microprocessor 72. For the sake of simplicity and brevity, the control routines to follow will be described with respect to the implementation of the control algorithms of the present invention. It should be understood that in addition to the control functions of the present control arrangement herein described there may be other control functions to be performed in conjunction with other operating characteristics of the appliance and in the control of the other three heating elements. Instructions for carrying out the routines described in the diagrams may be interleaved with instructions and routines for other control functions which are not part of the present invention.

The control program consists of a sequence of routines illustrated in the flow diagrams. The control program is cycled through once each control interval, i.e. once each 133 milliseconds. It should be noted that the control circuit is continually energized while the appliance is plugged in so that the control program for heating element 12 is cycled through every 133 milliseconds even if the OFF setting is selected. Hence, a power control decision for heating element 12 is made every 133 milliseconds.

The control program for controlling energization of heating element 12 is logically separated into several control routines. The Input Scan routine scans mode select switch 32 and conducts the A/D conversion of the analog voltage signal from input potentiometer 102 to determine the user selected mode and heat settings. The Temp Scan routine conducts the A/D conversion of the analog voltage signal representing the sensed utensil temperature. The Filter and Timing routine performs a software filter function resulting in an output signal which is the filtered utensil temperature signal. This routine also controls periodic sampling of the filtered signal to minimize radiation effects on its accuracy. This periodic sample is employed in the appropriate one of the Warm, Simaer, Boil and Fry routines to determine the power level to be implemented as a function of the selected mode and heat setting and the sensed utensil temperature. The Pan Removal Boil, Pan Removal Fry and Pan Removal Warm/Simmer routines detect the utensil removal condition and the Removal Out routine controls energization of the buzzer to alert the user to the occurrence. The appropriate power level is input to the Power Compare routine which makes the power control decision and the Power Out routine then triggers power control triac 82 into conduction as appropriate thereby implementing the corresponding duty cycle for the desired power level. Each of the control program routines will be described in greater detail with reference to its flow diagram in the discussion to follow.

Figure 6:
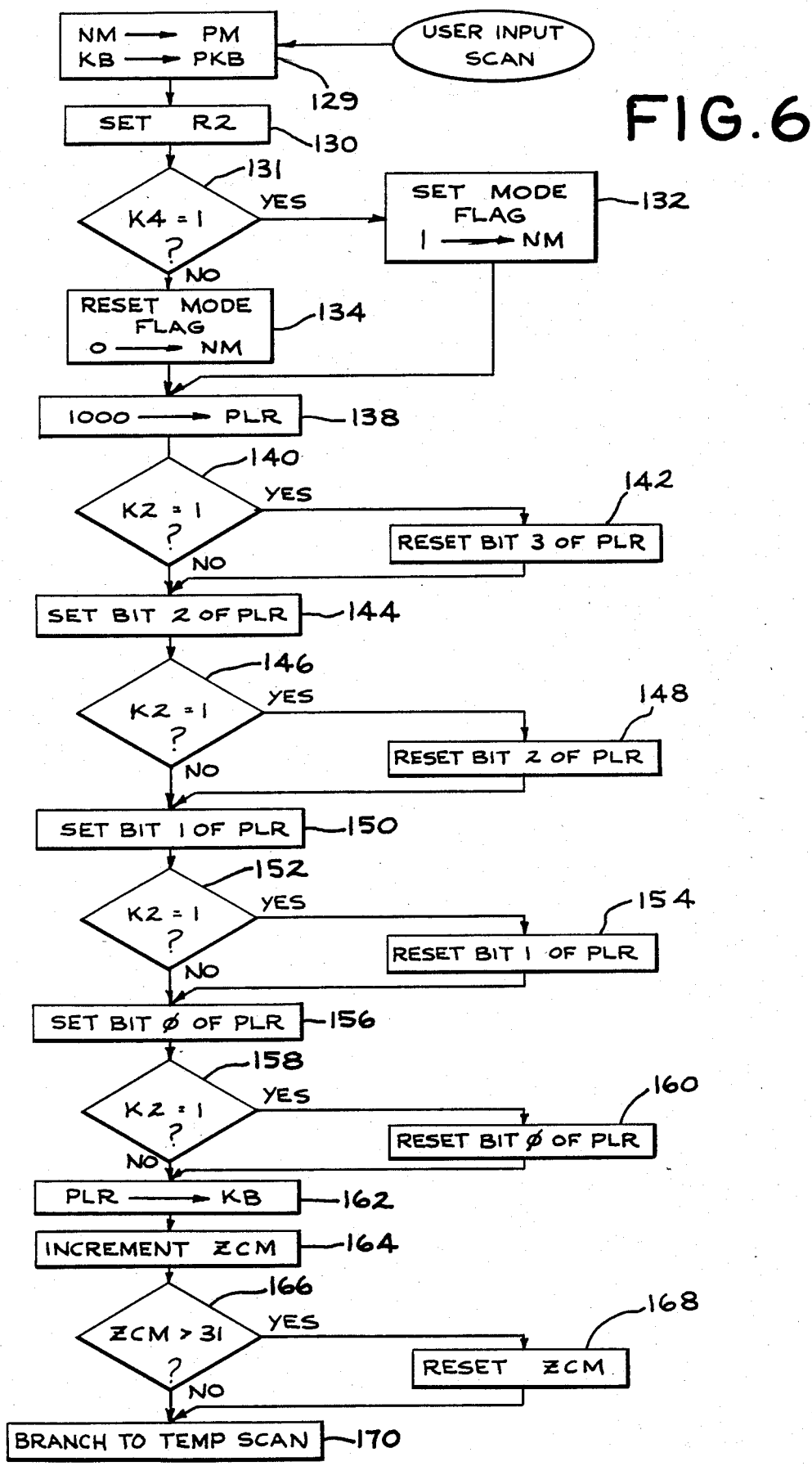
FIG. 6 is a flow diagram of the USER INPUT SCAN routine incorporated in the control program for the microprocessor in the circuit of FIG. 5.

USER INPUT SCAN Routine—FIG. 6

The function of this routine is to identify the mode selected by the user via mode select switch 32 and the heating setting selected by the user via control knob 22. Before determining the new mode selection and heat setting, it is necessary to store in memory the mode and heat selections from the previous pass through the routine for use in the hereinafter described removal detection routines.

Referring now to FIG. 6 the previous mode NM and heat settings KB are stored as PM and PKB, respectively (Block 129). The state of mode select switch 32 is determined by setting output R2 (Block 130). Inquiry 131 then scans input port K4 to determine whether switch 32 is open (K4=0) or closed (K4=1). If K4=1, signifying selection of the Fry Mode, a Mode Flag is set for future reference in a subsequent routine (Block 132) and variable NM representing the new mode selection is set to 1 (Block 133). If K4=0, signifying selection of the Boil Mode, the Mode Flag is reset and NM is set to zero (Block 134).

Following determination of the selected mode, the analog output from potentiometer 102 is converted to a digital signal. It will be recalled that there are 16 possible heat settings, each represented by a corresponding digital signal. In this routine PLR is a digital word which sets the reference voltage in the A/D conversion scheme via the resistor ladder network portion of A/D converter 76. PLR is varied in accordance with a successive approximation technique and the voltage generated at the output of operational amplifier 100 (FIG. 5) corresponding to each word is compared to the voltage signal at potentiometer arm 102a by comparator 128 to determine the power level selected.

TABLE III

| Digital Code | Corresponding Analog Voltage (volts) | Heat Setting Voltage Range (volts) | KB |
|---|---|---|---|
| 00000 | 10.00 | 10.0 | 0 |
| 00010 | 9.42 | 9.42–10.0 | 1 |
| 00100 | 8.84 | 8.84–9.42 | 2 |
| 00110 | 8.26 | 8.26–8.84 | 3 |
| 01000 | 7.67 | 7.67–8.26 | 4 |
| 01010 | 7.10 | 7.10–7.67 | 5 |
| 01100 | 6.56 | 6.56–7.10 | 6 |
| 01110 | 5.94 | 5.94–6.56 | 7 |
| 10000 | 5.35 | 5.35–5.94 | 8 |
| 10010 | 4.78 | 4.78–5.35 | 9 |
| 10100 | 4.19 | 4.19–4.78 | A |
| 10110 | 3.61 | 3.61–4.19 | B |
| 11000 | 3.02 | 3.02–3.61 | C |
| 11010 | 2.44 | 2.44–3.02 | D |
| 11100 | 1.86 | 1.86–2.44 | E |
| 11110 | 1.28 | 1.28–1.86 | F |

The digital code generated at outputs $0_0$–$0_4$ during the analog to digital conversion of the input voltage from wiper arm 102a is listed in Table III together with the corresponding analog voltage which is generated at output 124 of operational amplifier 120. The digital code in Table III is a five bit code, whereas the aforementioned PLR is a four bit word. The five bit code represents the code stored in the 0-register at microprocessor 72. The least significant bit of this code is derived from the status latch of microprocessor 72. The next four bits are derived from the four bit PLR word. Since the least significant bit is always zero for the code in Table III, when performing the user input scan, the status latch is always reset, i.e. zero, and the scan is performed by simply varing PLR and outputting the contents of PLR and the status latch to the 0-register. The column headed KB in Table III shows the hexadecimal representation for the digital code assigned in this routine to variable KB. KB represents the selected heat setting for analog potentiometer voltages in the voltage ranges shown. Wiper arm 102a is mechanically coupled to control knob 22 such that for each heat setting, the potentiometer output voltage lies near the middle of the corresponding voltages ranges shown in Table III.

Referring now to FIG. 6, the search starts in the middle by storing the PLR code representing heat setting 8 (1000→PLR) (Block 138). The four bits of the PLR word are individually referred to hereinafter as 0, 1, 2, 3 with 0 designating the least significant of the four bits.

This state of output ports $0_0$–$0_4$ (10000) causes a voltage of 5.35 volts to appear at amplifier output 124 (FIG. 5). Inquiry 140 determines if the voltage representing the operator selected heat setting is higher (K2=1) signifying a lower selected heat setting or lower (K2=0) signifying a higher selected heat setting. Referring briefly to FIG. 5, K2=1, if the voltage at wiper arm 102(a) is greater than 5.35 volts signifying KB=8 or less. K2=0 signifies that the wiper arm voltage is less than 5.35 volts signifying KB greater than 8. If K2=1, PLR is set equal to 4 by resetting Bit 3 (Block 142) amd settimg Bit 2 (Block 144) (0100→PLR). If K2=0, PLR is set equal to 12 by simply setting Bit 2 (1100→PLR) (Block 144). Inquiry 146 determines if the selected heat setting is higher or lower than the present PLR. If lower (K2=1), PLR is decreased by 2 by resetting Bit 2 (Block 148) and setting Bit 1 (Block 150). If higher (K2=0), the PLR is increased by 2 by setting Bit 1 (Block 150).

Inquiry 152 determines whether the selected heat setting higher or lower than the present value of PLR. If lower (K2=1), PLR is decreased by 2 by resetting Bit 1 (Block 154) and setting the least significant bit designated Bit 0 (Block 156). If higher (K2=0), PLR is increased by 1 by setting Bit 1 (Block 156).

Inquiry 158 determines whether the selected heating setting is higher or lower than the PLR. If lower (K2=0), PLR is reduced by one by resetting Bit 0 (Block 160) and then PLR is read into KB (Block 162). If higher (K2=0), PLR is read into KB (Block 162 ). Memory location KB now stores a digital signal representing the user selected power setting. The designator KB will hereinafter be used interchangeably with reference to the memory location and the signal itself. The specific meaning will be clear from the context.

Finally, the master counter (ZCM) which controls the duration of the control period is incremented (Block 164). It will be recalled that the control period is approximately 4.4 seconds corresponding to 32 control intervals. This routine is executed once every 133 milliseconds. Thus, the ZCM counter functions as a 32 count ring counter. The ZCM count is checked by Inquiry 166. If ZCM is greater than 31, ZCM is reset (Block 168). The ZCM count is utilized in the Power Out routine to be hereinafter described. The program now branches (Block 170) to the TEMP SCAN routine (FIG. 7A).

Figure 7A:
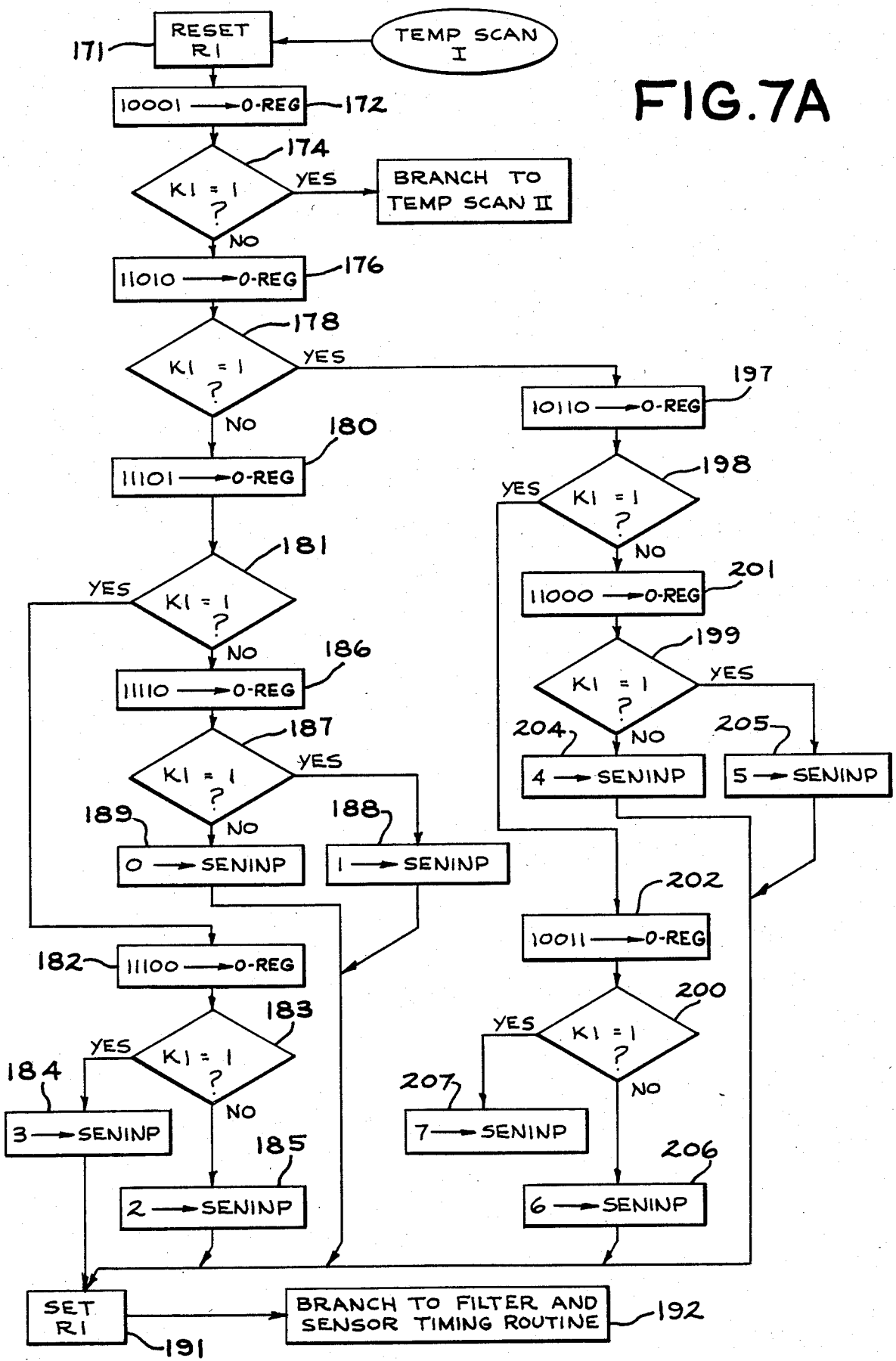
FIGS. 7A and 7B are flow diagrams of the TEMPERATURE SCAN routine incorporated in the control program for the microprocessor in the circuit of FIG. 5.
Figure 7B:
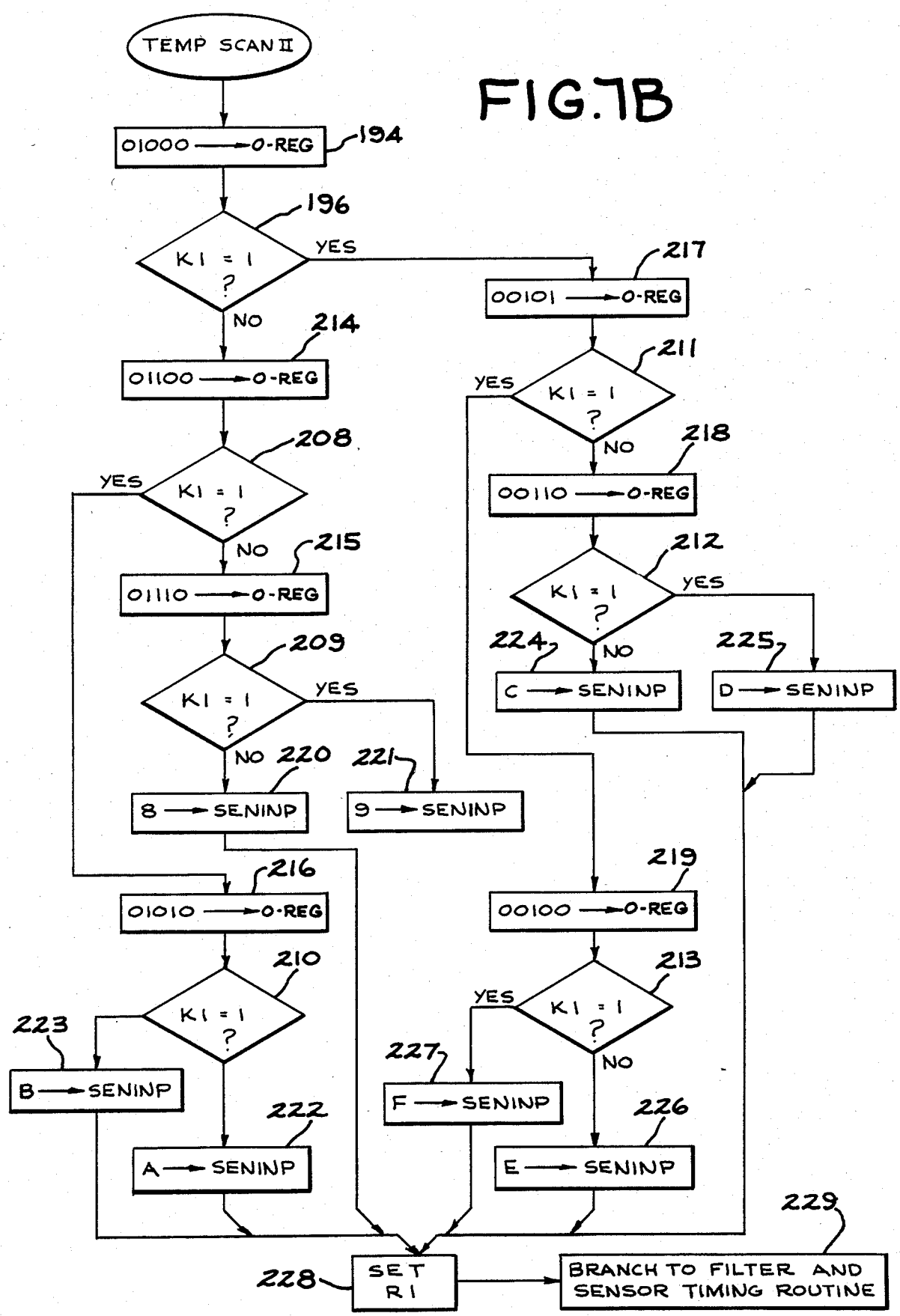

TEMP SCAN Routine—FIGS. 7A and 7B

The function of this routine is to convert the analog voltage at output 124 of amplifier 120 (FIG. 5) representing the sensed utensil temperature to a digital signal representative of the sensed utensil temperature. More specifically, this routine determines within which of the 15 predetermined temperature ranges the present sensed utensil temperature falls. A hexadecimal value is assigned to each of the 15 temperature ranges, as shown in Table IV. The relationship of the value of the various temperature variables used in the routines to be hereinafter described including SENINP and SENOUT to temperature is defined by this Table IV.

TABLE IV

| Hex Rep | Temp. Range °F. | Code | Analog Volts | Threshold T °F. |
|---|---|---|---|---|
| 0 | T < 121 | 11110 | 1.28 | |
| 1 | 121 ≦ T < 147 | 11101 | 1.57 | 121 |
| 2 | 147 ≦ T < 167 | 11100 | 1.86 | 147 |
| 3 | 167 ≦ T < 198 | 11010 | 2.44 | 167 |
| 4 | 198 ≦ T < 220 | 11000 | 3.02 | 198 |
| 5 | 220 ≦ T < 241 | 10110 | 3.61 | 220 |
| 6 | 241 ≦ T < 269 | 10011 | 4.48 | 241 |
| 7 | 269 ≦ T < 287 | 10001 | 5.06 | 269 |
| 8 | 287 ≦ T < 316 | 01110 | 5.94 | 287 |
| 9 | 316 ≦ T < 336 | 01100 | 6.56 | 316 |
| A | 336 ≦ T < 360 | 01010 | 7.10 | 336 |
| B | 360 ≦ T < 387 | 01000 | 7.67 | 360 |
| C | 387 ≦ T < 423 | 00110 | 8.26 | 387 |
| D | 423 ≦ T < 444 | 00101 | 8.55 | 423 |
| E | 444 ≦ T < 472 | 00100 | 8.84 | 444 |
| F | 472 ≦ T | 00010 | 9.42 | 472 |

Referring now to FIGS. 7A and 7B, RI is reset (Block 171) to turn off transistor Q1 (FIG. 5) thereby enabling energization of thermistor 104. The search for the sensed utensil temperature range begins by setting five bit 0-register (0-REG) to 10001 corresponding to a reference temperature of 287° F. (Block 172). As in the User Input Scan routine the five bits for the 0-register code are derived from the four bit accumulator and the status latch. However, unlike the User Input Scan routine, in this routine the state of the status latch is also varied to generate the desired five bit codes.

Inquiry 174 determines whether the sensed temperature is greater (K1=1) or less (K1=0) than 287° F. If less, the 0-register code is changed to 11010 (Block 176) corresponding to a reference temperature of 198° F. Inquiry 178 determines if the sensed temperature is less than (K1=0) or greater than (K1=1) 198°. If less, the 0-register is changed to 11101 (Block 180) corresponding to a reference temperature of 147°; and Inquiry 181 determines if the sensed temperature is greater (K1=1) or less (K1=0) than 147°. If the sensed temperature is greater than 147°, 0-REG is changed to 11100 (Block 182) corresponding to a reference temperature of 167°. Inquiry 183 determines if the sensed temperature is greater (K1=1) or less (K1=0) than 167°. If the sensed temperature is greater than 167° (K1=1) then sensor input variable SENINP is set equal to 3 (Block 184) which represents a sensed temperature greater than 167° F. and less than 198°. If the temperature is less than 167° ((K1=0) Inquiry 183), then SENINP is set equal to 2 (Block 185), representing a sensed temperature greater than 147° and less than 167°.

Figure 8:
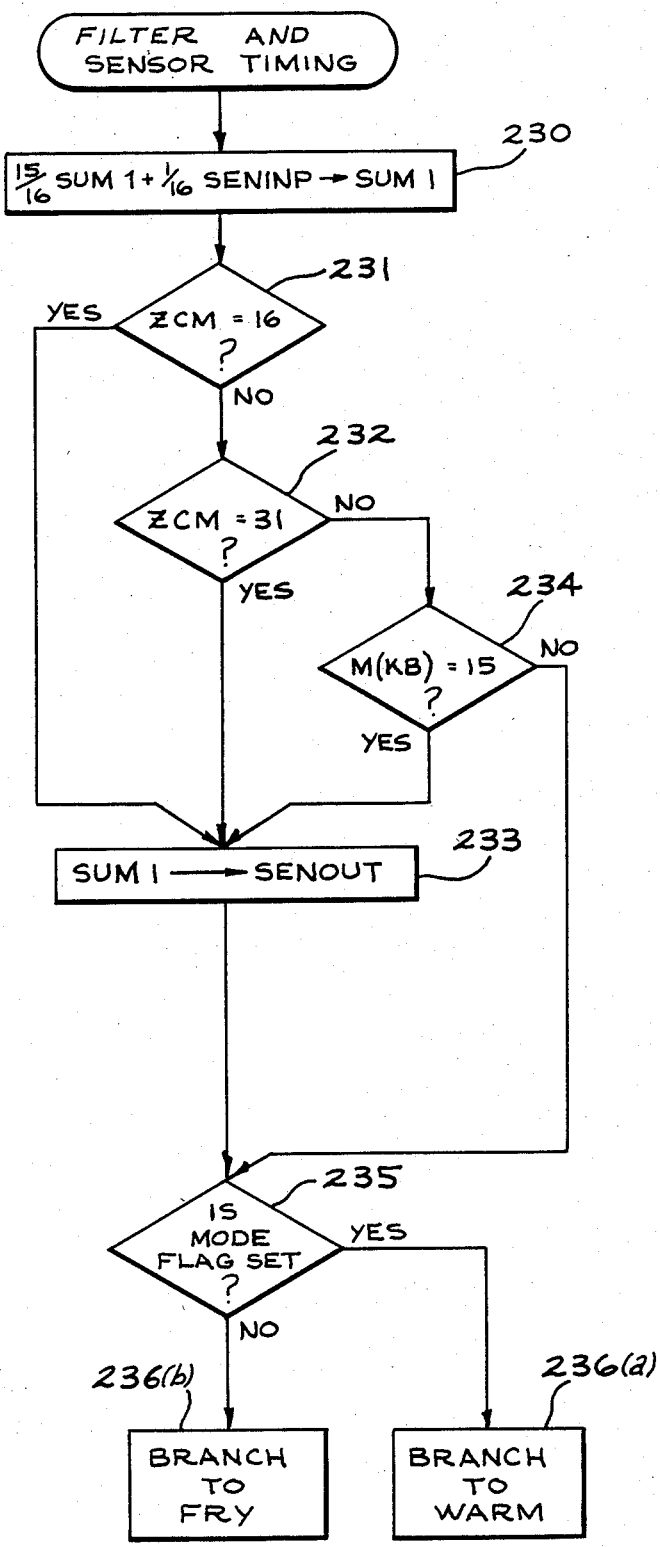
FIG. 8 is a flow diagram of the SENSOR FILTER and TIMING routine incorporated in the control program for the microprocessor in the circuit of FIG. 5.

Referring back to Inquiry 181, if the sensed temperature is less than 147° F., the 0-REG code is changed to 11110 (Block 186) corresponding to a reference temperature of 121° F. Inquiry 187 determines if the sensed temperature is greater (K1=1) or less than (K1=0) 121° F. If greater, SENINP is set to 1 (Block 188) representing a temperature greater than 121° F. and less than 147° F. If less, SENINP is set to 0 (Block 189) representing a sensed temperature less than 121° F. Once the sensed temperature range is determined, R1 is set (Block 191) turning off thermistor Q1 thereby de-energizing thermistor 104 and the program branches (Block 192) to the Filter and Sensor Timing routine (FIG. 8).

If at Inquiry 178 the sensed temperature is greater than 198° F. (KI=1), the 0-register code is changed to 10110 (Block 197). Inquiries 198, 199 and 200 would check for sensed temperatures greater than 241° F., 220° F. and 269° F., respectively. Blocks 201 and 202 would appropriately set the 0-register code, and Blocks 204, 205, 206 and 207 would assign the appropriate one of temperature range code 4, 5, 6 and 7, respectively, to SENINP.

Similarly, if Inquiry 174 determines K1 equals one, signifying a sensed utensil temperature greater than 287° F., the program branches to Block 194 (FIG. 7B) where the 0-register code is changed to 01000 representing 387°. Inquiry 196 determines if the sensed utensil temperature is greater (K1=1) or less than (K1=0) 387° F. Such comparisons are repeated by Inquiries 208–213 until the temperature is found to lie in one of the sixteen ranges. Blocks 214–219 appropriately set the 0-register code, and the appropriate one of Blocks 220–227 assigns the appropriate one of temperature range codes 8, 9, A, B, C, D, E, F, respectively, to variable SENINP. The program then branches to the SENSOR FILTER and TIMING routine (FIG. 8).

While in the illustrative embodiment the USER SETTING SCAN routine is executed before the TEMP SCAN routine, these routines could just as well be executed in reverse order.

SENSOR FILTER and TIMING Routine—FIG. (8)

This routine performs the dual function of iteratively filtering the sensor output temperature signal SENINP and also controlling the timing of the updating of the temperature signal which is actually used in the control routines yet to be described. The filter function is implemented to minimize the impact of aberrant temperature measurement inputs from the temperature monitoring circuit; the timing function is implemented to minimize the effect of radiant energy from the heating element 12 impinging on thermistor 104 on the accuracy of the temperature measurements.

The iterative filter portion of this routine attaches relatively little weight to each individual input. Hence, isolated erroneous inputs are averaged out so as to have little effect on the accuracy of the cumulative average signal provided by the filter routine. Referring to FIG. 8, the filter function is performed by Block 230. It will be recalled that SENINP is the hexadecimal representation of the temperature range for the sensed utensil temperature determined in the hereinbefore described TEMP SCAN routine. One-sixteenth of the new SENINP input is added to 15/16 of the filter output variable designated SUM 1 from the previous pass through this routine. The resultant sum becomes the new value for the filter output variable SUM 1.

A new temperature input signal SENINP is processed by the filter portion of this routine to generate a new SUM 1, during each pass through the control routine, i.e. once every 133 milliseconds corresponding to 8 cycles of the 60 Hz power signal. However, to minimize the effects of radiant energy from heating element 12 on sensor 50, the sensed utensil temperature signal which is input to the power control portion of the control program is updated during selected portions of the 4.4 second duty cycle control period.

It will be recalled that the ZCM counter operates as a 32 count ring counter, i.e. the counter counts from 0–31 and resets to 0. In the duty cycle control implemented in the POWER OUT routine to be hereinafter described, for duty cycles less than 100% the heating element is energized during the first part of the control period when the ZCM count is relatively low and de-energized while the ZCM count is relatively high. Since, except when operating at the 100% power level, the heating element is always de-energized for count 31, radiant energy effects on the sensor are minimum at ZCM count 31. Thus, radiation effects are minimized by updating SENOUT, the temperature signal utilized in implementation of the Power Control routine only at count 31. It is desirable, however, to have at least two updates of SENOUT during each 4.4 second control period, to limit oscillations between inputs. Hence, SENOUT is also updated at the midpoint of the control period, i.e. at count 16. There is potentially more error due to radiation effects for this measurement; however, the heating element is de-energized at this point for the twelve lower power levels. Hence, the effects of radiation even on this reasurement are minimum except at the highest 4 power levels.

When the heating element is operated at 100% duty cycle, the radiation effects are the same at all counts; hence, for maximum accuracy SENOUT is updated during each execution of the control program, i.e. every 133 milliseconds.

Referring again to the flow diagram of FIG. 8, Inquiries 231 and 232 look for ZCM counts of 16 and 31, respectively. Upon the occurrence of either count, SENOUT is updated by the then current value of SUM 1 (Block 233). Otherwise, Inquiry 234 checks to determine if the power level presently being implemented is the 100% power level (M(KB)=15). If it is, SENOUT is updated by SUM 1 (Block 233) regardless of the count; if not, Block 233 is bypassed, and SENOUT is not updated during this pass. In this fashion for power levels lower than 15, SENOUT is updated only on counts 16 and 31, and when power level 15 is being implerented SENOUT is updated every count.

Figure 12:
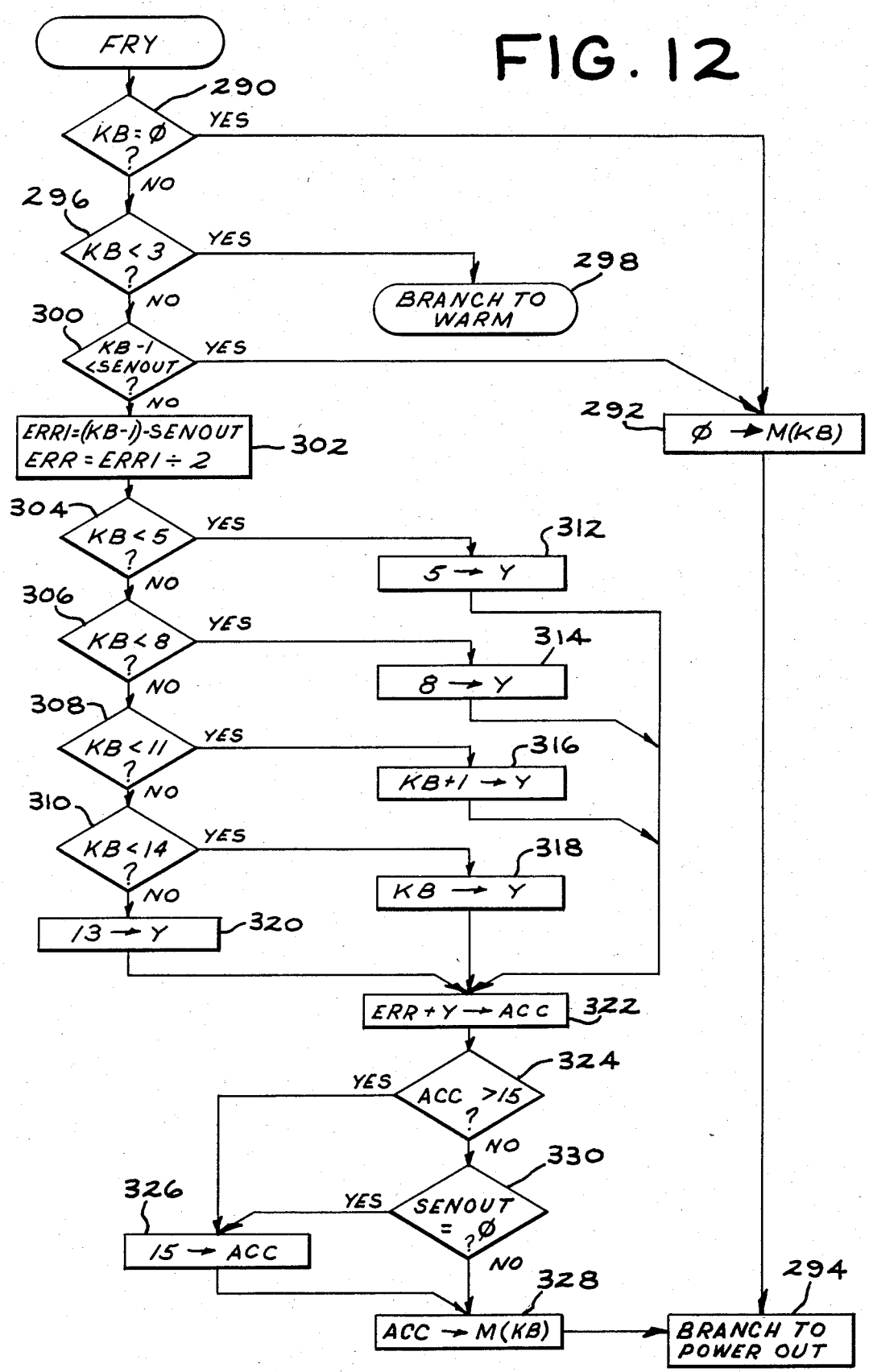
FIG. 12 is a flow diagram of the FRY routine incorporated in the control program of the microprocessor in the circuit of FIG. 5.

Inquiry 235 checks the state of the Mode Flag. If set, signifying selection of the Boil Mode, the program branches (Block 236a) to the WARM Routine (FIG. 9); if reset, the program branches (Block 237b) to the FRY Routine (FIG. 12).

Figure 9:
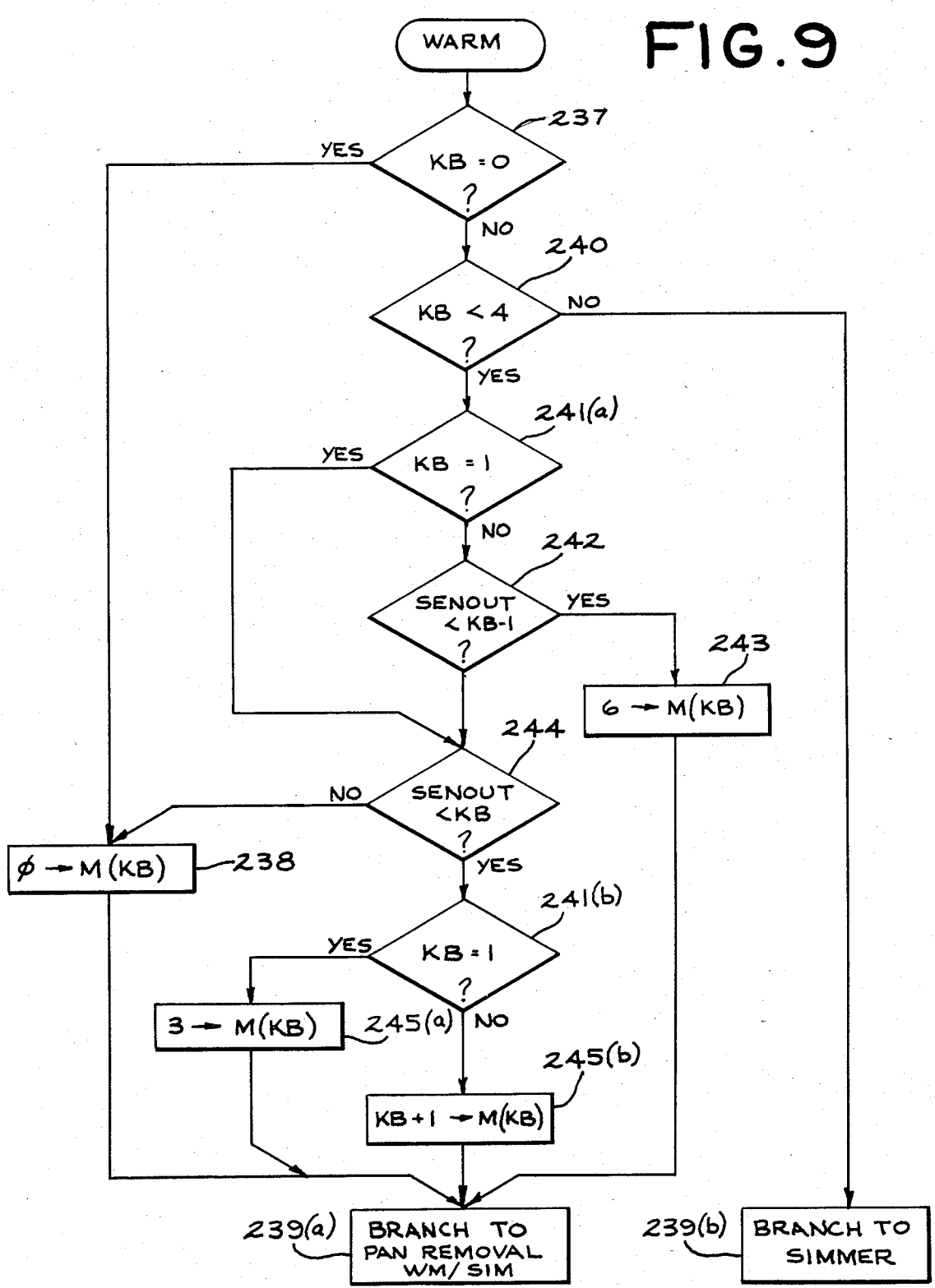
FIG. 9 is a flow diagram of the WARM routine incorporated in the control program of the microprocessor in the circuit of FIG. 5.

WARM Routine—FIG. 9

This routine is entered whenever the general Boil Mode is selected by mode switch 32. As will hereinafter be described this routine is also entered when either of the lower two heat settings for the Fry Mode are selected. The function of this routine is to implement the Warm Mode.

It will be recalled that in the Warm Mode except for the Wm(1) setting (KB=1) the heating element is operated at power level 6 when the sensed utensil temperature is less than the predetermined minimum warm reference temperature of 121° F. to rapidly bring the utensil to the desired temperature; is operated at the steady state power level associated with the selected heat setting when the temperature is within the steady state temperature range for that heat setting; and is de-energized when the sensed utensil temperature exceeds the steady state range. In Wm(1) power level 3 is applied for sensed utensil temperature less than 121° F. and power level 0 is applied for sensed utensil temperature greater than 121° F. to minimize thermal overshot at this low setting.

Figure 13:
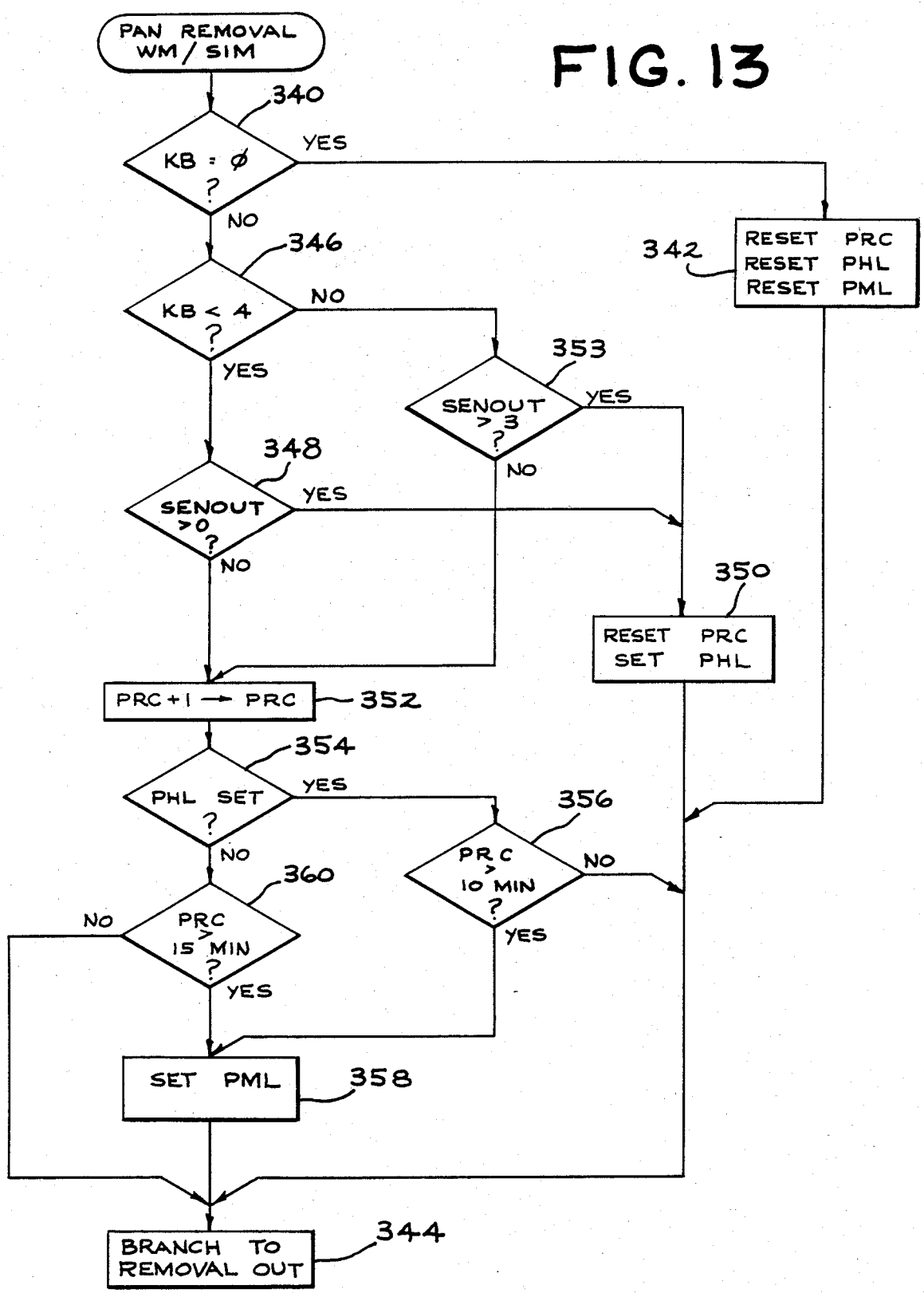
FIG. 13 is a flow diagram of the PAN REMOVAL WARM/SIMMER routine incorporated in the control program for the microprocessor in the circuit of FIG. 5.

Referring now to the flow diagram of FIG. 9, Inquiry 237 checks the user input for an OFF heat setting (KB=0). If yes, M(KB) is set to zero signifying implementation of the OFF or zero power level (Block 238) and the program branches (Block 239(a)) to the Pan Removal Warm/Simmer routine (FIG. 13). Otherwise, Inquiry 240 checks for a heat setting less than setting 4.

As will become apparent in the description of the Power Compare routine, M(KB) is the variable utilized in that routine to implement the appropriate duty cycle. The duty cycle associated with each value of M(KB) is illustrated in Table I.

Figure 10:
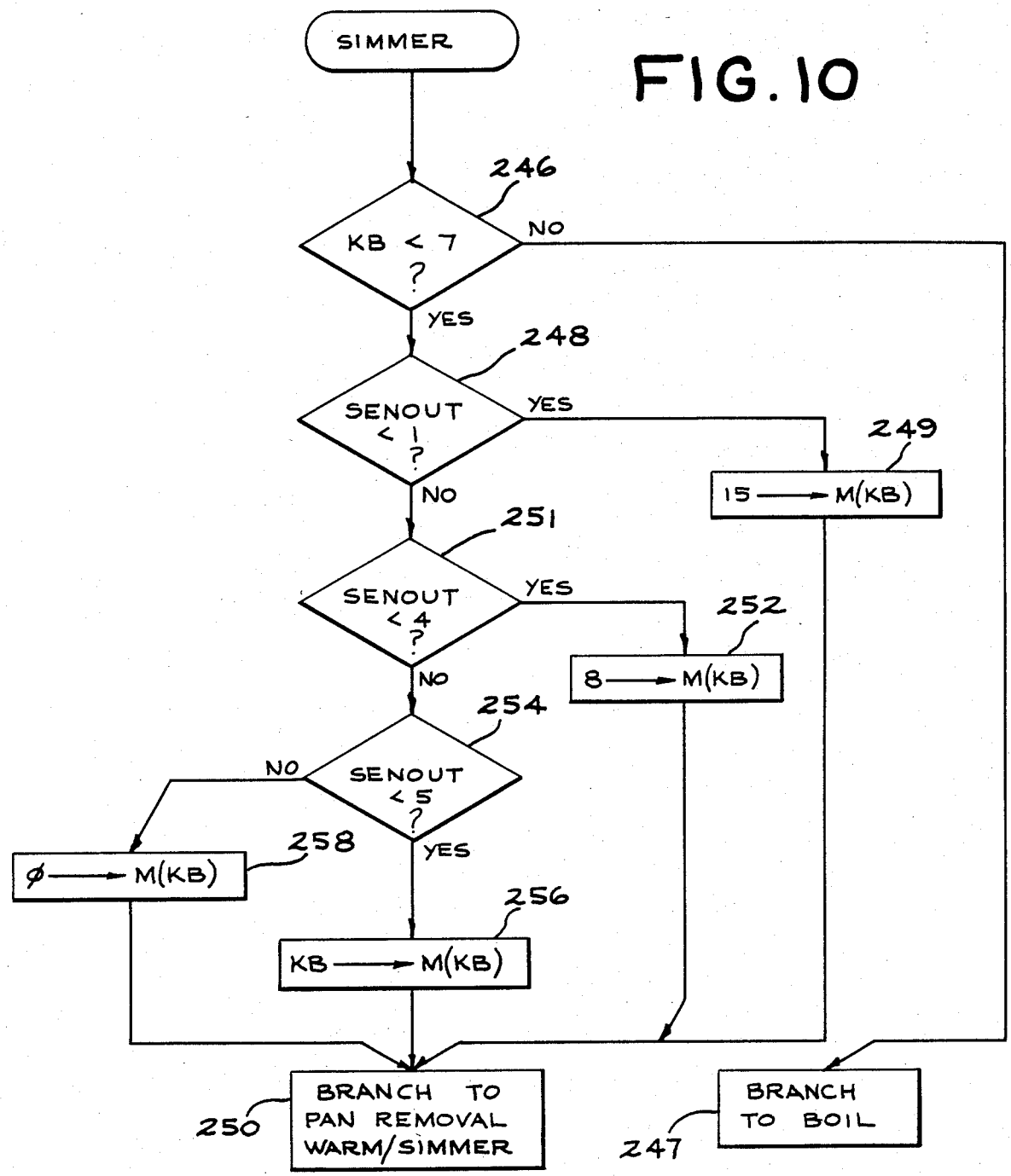
FIG. 10 is a flow diagram of the SIMMER routine incorporated in the control program of the microprocessor in the circuit of FIG. 5.

In the general Boil Mode, heat settings 1, 2 and 3 are the Warm Mode heat settings. If a heat setting other than 1, 2 or 3 is selected the program branches (Block 239(b)) to the Simmer routine (FIG 10). If one of heat settings 1-3 has been selected, the program proceeds to Inquiry 241(a) which determines if heat setting Wm(1) (KB=1) is selected. If not, the program proceeds to Inquiry 242 which determines if the sensed utensil temperature variable SENOUT is less than (KB-1), signifying a sensed utensil temperature less than 121° F. If SENOUT is less than (KB-1), power level 6 is set by setting M(KB) to 6 (Block 243). The program then branches (Block 239) to the Pan Removal Wm/Sim routine (FIG. 13).

Referring again to Inquiry 242, if the sensed utensil temperature is not less than (KB-1) the program proceeds to Inquiry 244 which checks for the upper temperature limit.

In the event Inquiry 241(a) determines that Wm(1) has been selected (KB=1), then Inquiry 242 is bypassed and the program proceeds directly to Inquiry 244. For heat setting KB=1, KB=2 and KB=3, the maximum warm temperature limits are 121°, 147° and 167° F. corresponding to SENOUT=1, SENOUT=2 and SENOUT=3 respectively. If Inquiry 244 determines that the sensed utensil temperature is less than the maximum warm reference temperature for the selected heat setting (SENOUT<KB), then Inquiry 241(b) checks for KB=1. If Wm(1) is selected (KB=1), power level 3 is set by setting M(KB) to 3 (Block 245(a)). If Wm(1) is not selected, the steady state power level associated with the heat setting is set by setting M(KB) to (KB+1) (Block 245(b)). This implements the steady state power levels 3, 3 and 4 for heat settings 1, 2 and 3, respectively, corresponding to duty cycles of 9%, 9% and 12.5%, respectively (See Tables I and II). If the sensed utensil temperature is not less than the maximum warm reference temperature, M(KB) is set to 0 (Block 238) corresponding to the zero or OFF power level. M(KB) having been set by the appropriate one of Blocks 238, 243, 245(a) or 245(b), the program then branches (Block 239(a)) to the Pan Removal Wm/Sim routine (FIG. 13).

SIMMER Routine–FIG. 10

The function of this routine is to implement the Simmer Mode. The user initiates the Simmer Mode by first selecting the General Boil Mode via mode select switch 32 and then by selecting one of heat settings 4–6 via control knob 22 (FIGS. 1 and 2). This routine is entered from the Warm routine (FIG. 9) whenever the General Boil Mode has been selected and the selected heat setting is greater than 3.

It will be recalled that the function of the Simmer Mode is to bring water loads rapidly to a temperature level close to the boiling point and holding that temperature without actually boiling. To this end, the heating element is energized at a relatively high predetermined power level when the sensed utensil temperature is less than a predetermined minimum simmer reference temperature. In the illustrative embodiment, the heating element is operated at power level 15 (100% duty cycle) as long as the sensed utensil temperature less than 121° F. For sensed utensil temperatures greater than the minimum simmer reference (121° F.) and less than an intermediate simmer reference temperature, the heating elerent is operated at an intermediate power level. In the illustrative embodiment, the intermediate reference temperature is 198° F. and the intermediate power level is power level 8 (31.5% duty cycle). For sensed utensil temperatures greater than the intermediate reference temperature (198° F.) and less than a maximum simmer reference temperature, the heating element is operated at the power level associated with the selected heating setting. In the illustrative embodiment, the maximum simmer reference temperature is 220° F. and the power levels are 4–6 for heat settings 4–6, respectively.

For sensed utensil temperatures greater than the maximum simmer reference temperature (220° F.) the heating element is de-energized, i.e. power level 0 is implemented.

Figure 11:
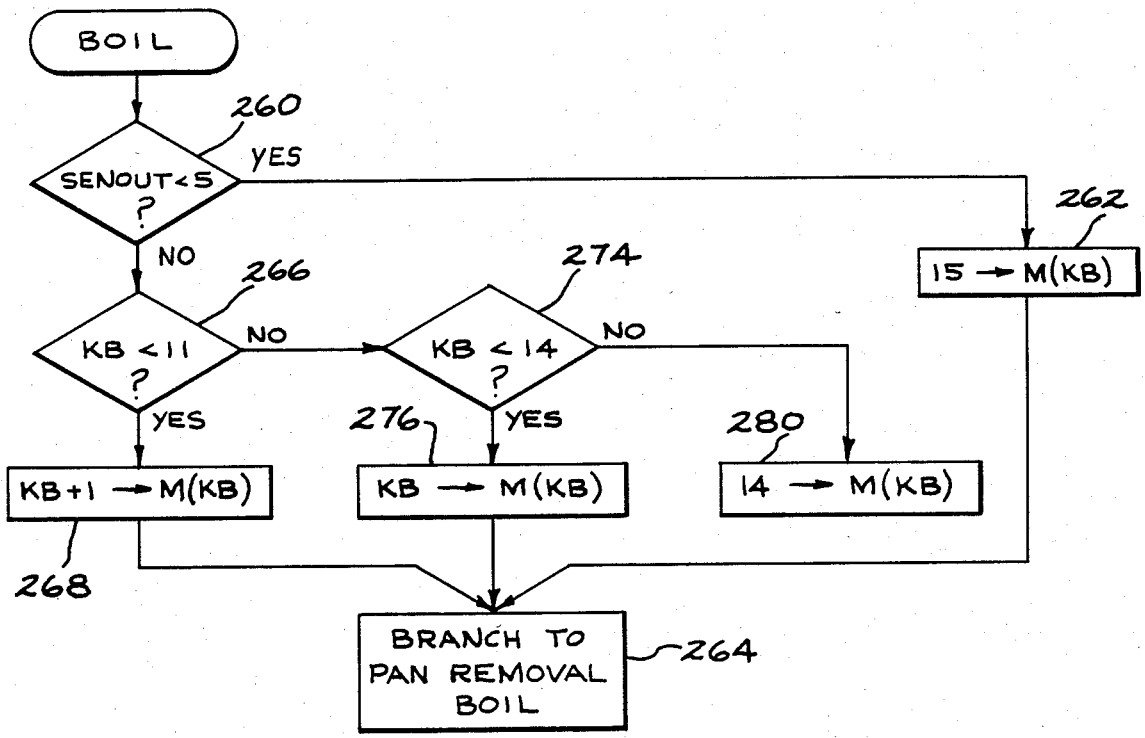
FIG. 11 is a flow diagram of the BOIL routine incorporated in the control program of the microprocessor in the circuit of FIG. 5.

Referring now to the flow diagram of FIG. 10, it will be recalled that the program enters this routine for heat settings greater than 3. Inquiry 246 looks for a heat setting selection less than 7. If KB is not less than 7, indicating a heat setting higher than 6, the program branches (Block 247) to the BOIL routine (FIG. 11). For heat settings 4–6, the program continues to Inquiry 248 which determines if the sensed utensil temperature is less than 121° F. (SENOUT<1). If yes, power level 15 is set by setting M(KB) to 15 (Block 249) and the program branches (Block 250) to the Pan Removal Wm/Sim routine (FIG. 13). For sensed utensil temperatures greater than 121° F., Inquiry 251 determines if the sensed utensil temperature is less than 198° F. (SENOUT<4). If yes, power level 8 is set by setting M(KB) to 8 (Block 252) and the program branches (Block 250) to the Pan Removal Wm/Sim routine (FIG. 13). If the sensed utensil temperature is greater than 198° F., Inquiry 254 determines if the sensed utensil temperature is less than 220° F. (SENOUT<5) If yes, the steady state power level for the selected heat setting is set by setting M(KB) to KB (Block 256) and the program branches (Block 250) to the Pan Removal Wm/Sim routine (FIG. 13). If the sensed utensil temperature is greater than 220°, the zero power level is set by setting M(KB) to zero (Block 258) and the program branches (Block 250) to the Pan Removal Wm/Sim routine, FIG. 13.

BOIL Routine—FIG. 11

This routine is entered from the Simmer routine (FIG. 10) when the Boil Mode is selected and the heat setting is one of the Lo, Med or Hi Boil settings. Its function is to implement the actual Boil Modes. In the actual Boil Modes, the water loads are brought to a boil with the boil rate being determined by the heat setting selected by the user. It will be recalled that in the Boil Mode the heating element is energized at a predetermined high power level until the sensed utensil temperature exceeds a predetermined minimum boil reference temperature. In the illustrative embodiment, the minimum reference temperature is 220° F. and the higher power level is power level 15 (100% duty cycle). When the sensed utensil temperature is greater than the minimum reference temperature, the heating element is energized at the steady state power level associated with the selected heat setting. The associated steady state power levels for settings 7-10 are 8–11, respectively. For heat settings 11-13 the associated steady state power levels are 11–13 respectively. For both heat settings 14 and 15 the associated steady state power level is 14.

Figure 14:
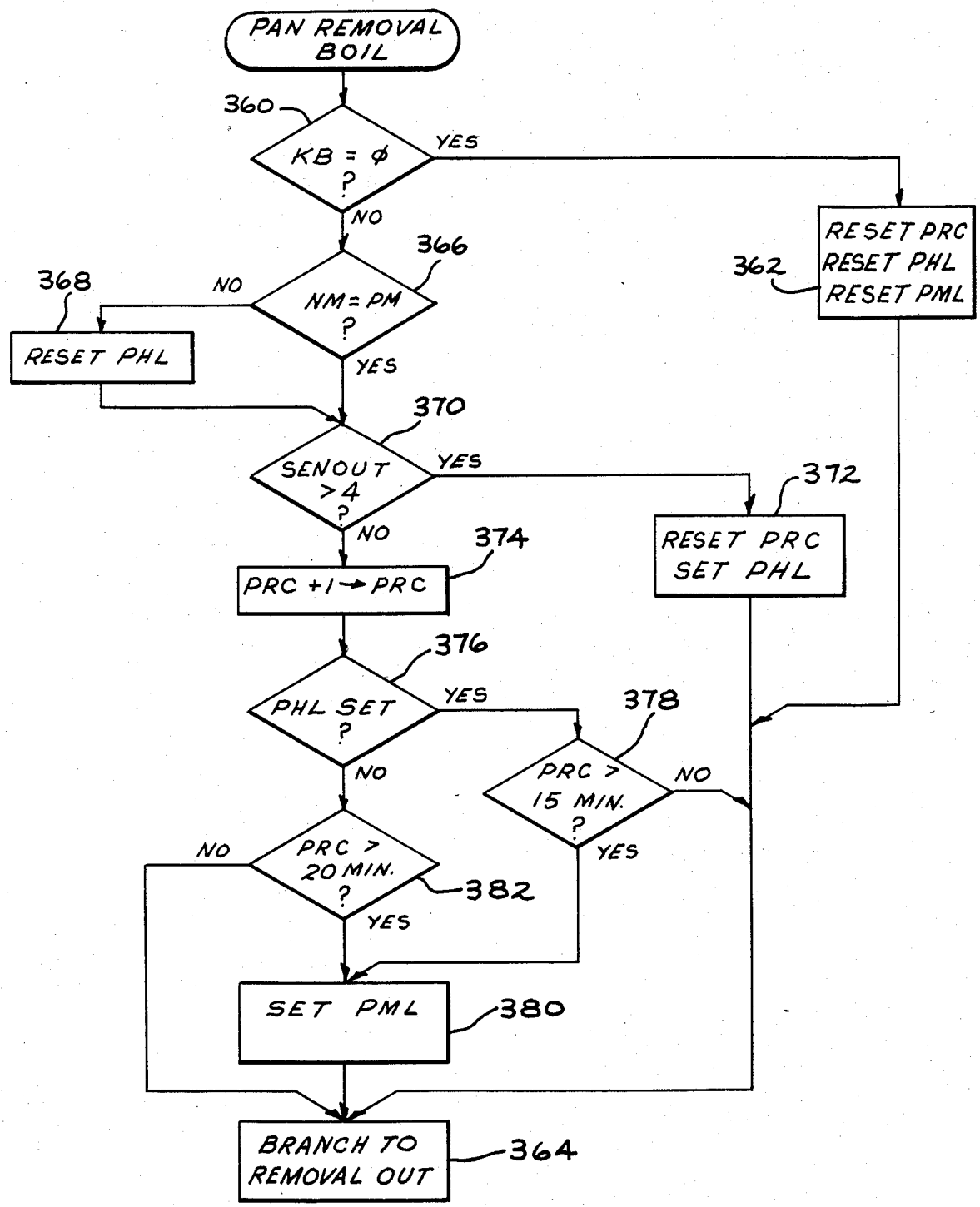
FIG. 14 is a flow diagram of the PAN REMOVAL BOIL routine incorporated in the control program for the microprocessor in the circuit of FIG. 5.

Referring now to the flow diagram of FIG. 11, Inquiry 260 determines if the sensed utensil temperature is less than the minimum boil reference temperature of 220° F. (SENOUT<5). If it is, power level 15 is set by setting M(KB) to 15 (Block 262) and the program branches (Block 264) to the Pan Removal Boil routine (FIG. 14). If the sensed utensil temperature is greater than 220°, Inquiry 266 detects the selection of any one of heat settings 7-10 (KB<11). For heat settings 7-10, the appropriate one of steady power levels 8-11, respectively, is set by setting M(KB) to KB+1 (Block 268). The program then branches (Block 264) to the Pan Removal Boil routine (FIG. 14). Inquiry 274 detects the selection of any one of heat settings 11-13. For these heat settings the appropriate one of power level, 11-13 respectively is set by setting M(KB) to KB (Block 276).

For heat settings 14-15, M(KB) is set to 14 to set the steady state power level at 14 for each of these heat settings. The program then branches (Block 264) to the Pan Removal Boil routine (FIG. 14).

FRY Routine—FIG. 12

The function of this routine is to implement the Fry Mode. This routine is entered when the user selects the Fry Mode via mode selection switch 32.

Figure 15:
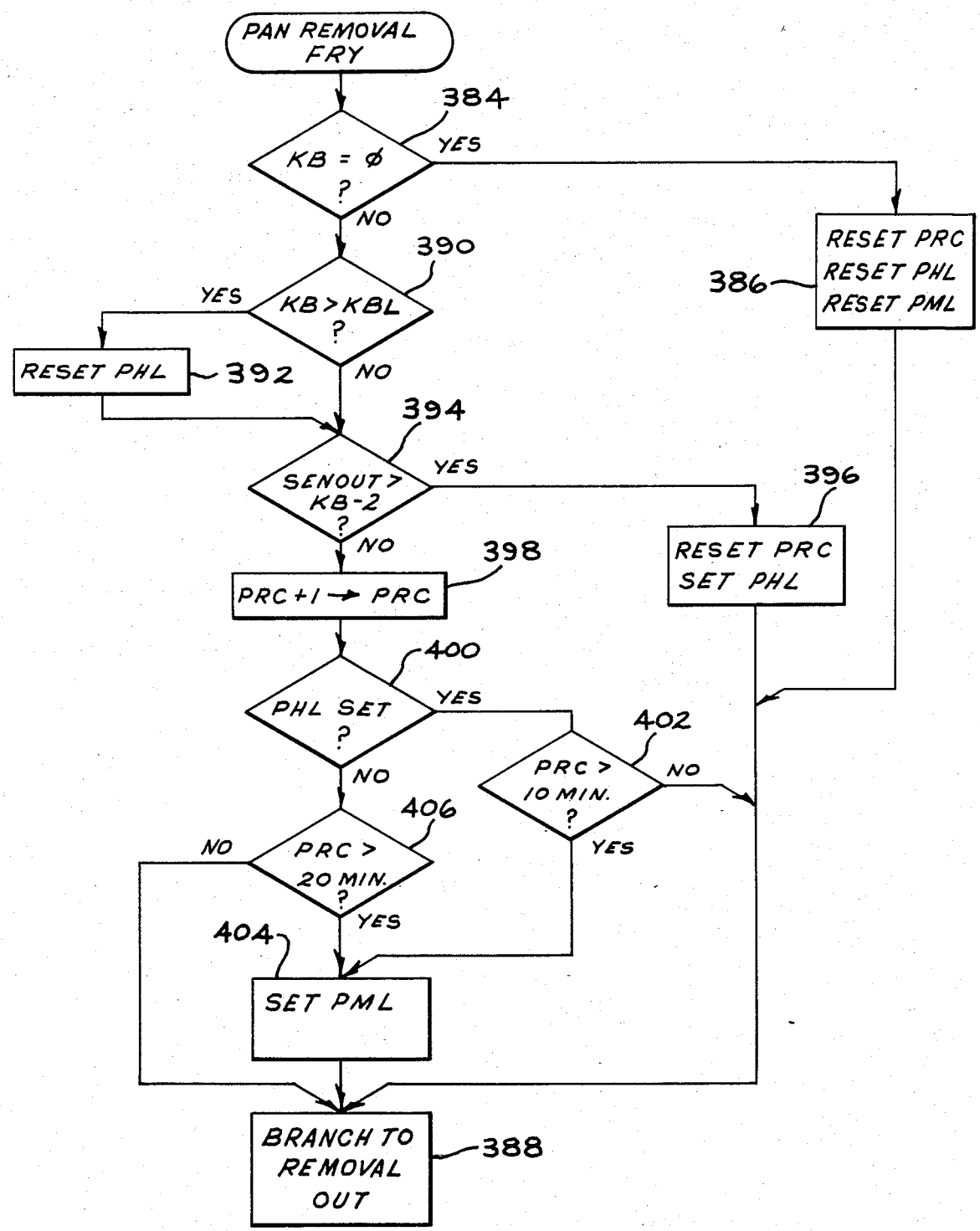
FIG. 15 is a flow diagram of the PAN REMOVAL FRY routine incorporated in the control program for the microprocessor in the circuit of FIG. 5.

Inquiry 290 checks for an OFF heat setting (KB=0). If OFF is selected M(KB) is set to zero (Block 292) and the program branches (Block 294) to the Power Out routine, FIG. 13A. Otherwise, Inquiry 296 determines if heat settings Wm(1) or Wm(2) corresponding to KB equal to 1 and 2, respectively, has been selected (KB<3) If so, the program branches (Block 298) to the Warm routine, FIG. 9. For heat settings greater than 2, Inquiry 300 compares the sensed utensil temperature SENOUT with the maximum steady state reference temperature for the temperature range for the selected heat setting, which in the Fry Mode is (KB−1). For SENOUT>(KB−1), signifying that the sensed utensil temperature exceeds the desired range, Power Level zero is implemented (Block 292), and the program branches (Block 294) to the Pan Removal Fry routine (FIG. 15). For sensed utensil temperature less than the desired reference temperature range an error signal (ERR) is computed (Block 302) as a function of the difference between the desired temperature range represented by (KB−1) and the sensed utensil temperature represented by SENOUT, by computing the difference between KB−1 and SENOUT and dividing the difference by two. Division by two to obtain ERR is done because use of the difference (ERR1) without division by two was empirically found to result in undesirable temperature overshoots under certain conditions. After computing the error signal, Inquiries 304-310 check the selected heat setting. A variable Y, corresponding to the steady state power level for the selected heat setting is introduced in Blocks 312-320. If setting 3 or 4 is selected (KB<5) variable Y representing the steady state power level for the selected heat setting, is set to 5 (Block 312). If setting 5, 6 or 7 is selected (KB<8), variable Y is set to 8 (Block 314); if setting 8, 9 or 10 is selected (KB<11), Y is set to 9, 10 or 11, respectively, (Block 316); if setting 11, 12 or 13 is selected (KB<14), Y is set to 11, 12 or 13, respectively, (Block 318) and, finally, if setting 14 or 15 is selected, Y is set to 13 (Block 320). The error signal (ERR) is summed with steady state power level variable Y (Block 322) to generate a signal representing the power level to be applied designated (ACC). Inquiry 324 and Block 326 limit the maximum value for ACC to 15 in the event the sum of ERR+Y is greater than 15. The value of power level variable ACC is then stored in M(KB) to implement the appropriate power level in the Power Out routine and the program branches (Block 294) to the Pan Removal Fry routine (FIG. 15).

To further speed the temperature response of the system in the Fry Mode, power level 15 is implemented when the sensed utensil temperature is less than 121° F. This is implemented by Inquiry 330 which checks the sensed utensil temperature. If the sensed utensil temperature is less than 121° F. (SENOUT=0), ACC is set to 15 (Block 326), resulting in M(KB) being set to 15 (Block 328), and the program then branches (Block 294) to the Pan Removal Fry routine, FIG. 13.

PAN REMOVAL WM/SIM—FIG. 13

This routine is entered from the hereinbefore described Warm and Simmer routines. Its primary function is to detect a utensil removal condition when the surface unit is being operated in the Warm or Simmer operating modes. To this end the sensed utensil temperature is compared with the predetermined reference temperature for the selected one of these modes and the duration of time intervals during which the sensed utensil temperature is less than the reference temperature are determined.

Figure 16:
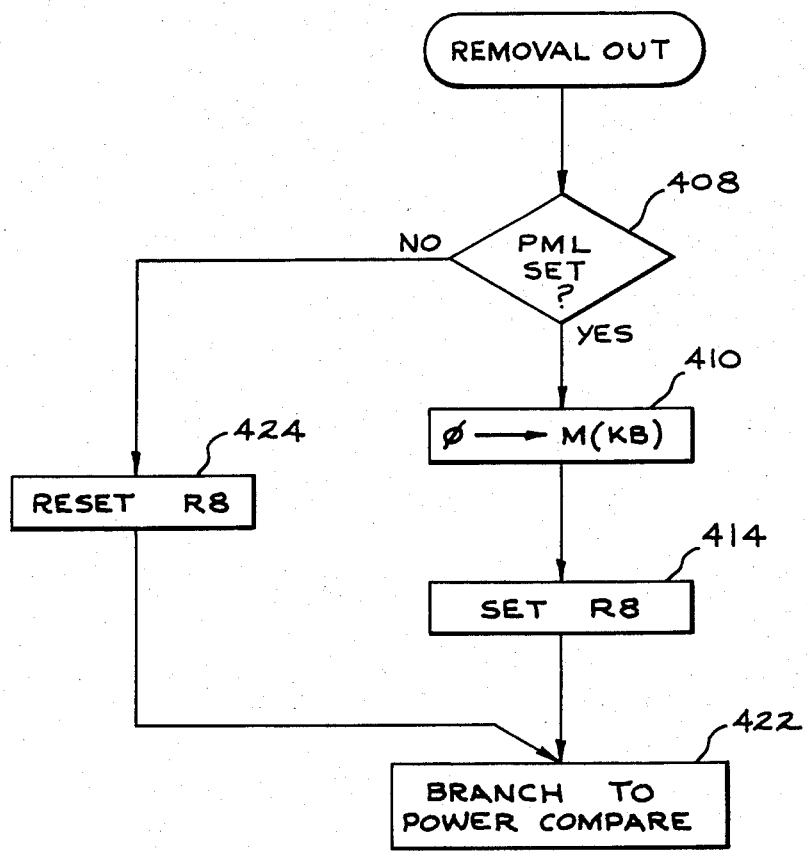
FIG. 16 is a flow diagram of the REMOVAL OUT routine incorporated in the control program for the microprocessor in the circuit of FIG. 5.

As an additional function this routine requires the user to select the OFF setting following the occurrence of a utensil removal condition before the control program will recognize new heat settings for the surface unit. In performing this function a latch designated PML is used (FIG. 16). PML is set upon detection of a utensil removal condition. As long as PML remains set, heat setting zero (OFF) is implemented regardless of the user selected heat setting. Once set, PML is only reset by selection of the OFF setting (KB=0) by the user.

Referring now to the flow diagram of FIG. 13, Inquiry 340 checks for the OFF setting (KB=0). If KB equals zero, the pan removal clock (PRC) which measures time interval durations is reset; a pan hot latch (PHL), which when set signifies that the reference temperature has been exceeded, is reset; and PML is reset (Block 342). The program then branches (Block 344) to the Removal Out routine (FIG. 16).

If KB is not zero, Inquiry 346 determines whether the Warm Mode (KB<4) or the Simmer Mode (KB≧4) has been selected. If KB is less than 4 signifying selection of the Warm Mode, Inquiry 348 determines if the sensed utensil temperature is greater than 121° F. (SENOUT>0). If SENOUT is greater than zero, the internal clock PRC is reset and PHL is set (Block 350) and the program branches (Block 344) to the Removal Out routine (FIG. 16). If SENOUT is zero, the clock (PRC) is incremented (Block 352) and the program proceeds to Inquiry 354. Similarly, if Inquiry 346 determines that KB was not less than 4, signifying selection of the Simmer Mode, Inquiry 353 determines if the sensed utensil temperature is greater than 198° F. (SENOUT>3), the reference temperature for the Simmer Mode. If yes, PRC is reset, PHL is set (Block 350) and the program branches (Block 344) to the Removal Out routine (FIG. 16). If SENOUT is not greater than 3, the clock (PRC) is incremented (Block 352) and the program proceeds to Inquiry 354.

It may be helpful to recall at this point that PRC is only incremented and Inquiry 354 is only reached if the sensed utensil temperature is less than the reference. This circumstance may result from heating the surface unit and utensil from room temperature, or from changing the contents of a utensil already at steady state or changing utensils on an already hot surface unit.

Inquiry 354 checks the state of the PHL latch. It will be recalled that this latch is set when the sensed utensil temperature first exceeds the pan removal reference temperature following a change in heat setting selection from OFF to a non-OFF heat setting. If PHL is set, signifying that the reference temperature has been previously exceeded and that the shorter reference time should be used, Inquiry 356 determines whether the temperature has been less than the reference for more than ten minutes. If it has, a utensil removal condition exists and PML is set (Block 358). The program then branches (Block 344) to the Removal Out routine (FIG. 16).

If PHL is not set, the utensil has not yet reached the threshold temperature after initial turn on, i.e. has not yet completed its initial heat up phase. Hence, the longer reference time period is to be used. Inquiry 360 determines whether the PRC is greater than fifteen minutes. If it is, a utensil removal condition exists; and PML is set (Block 358). The program then branches (Block 344) to the Removal Out routine (FIG. 16). If PRC is less than fifteen minutes, the program branches (Block 344) to the Removal Out routine (FIG. 16).

PAN REMOVAL BOIL Routine—FIG. 14

This routine is entered from the Boil routine. Its function is to detect a utensil removal condition when operating in the Boil Mode, by comparing the sensed utensil temperature to the Boil Mode pan removal reference temperature and detecting time intervals during which the temperature is less than the reference which exceeds the appropriate boil reference time intervals. This routine also resets the PML latch when the OFF setting is selected (KB=0) to return heat setting selection control to the user as hereinbefore described with reference to the Pan Removal Wm/Sim routine (FIG. 13).

Referring now to the flow diagram (FIG. 14) Inquiry 360 checks for KB=0, signifying selection of the OFF heat setting. If KB equals zero, the clock (PRC), the PHL latch and the PML latch are reset (Block 362), and the program branches (Block 364) to the Removal Out routine (FIG. 16).

If KB is not zero, Inquiry 366 compares the current mode selection NM with the previous mode selection PM. If NM is not equal to PM, the current mode setting represents a change from Fry to Boil. PHL is reset (Block 368) to provide the longer of the reference times to be employed even through the sensed utensil temperature may have exceeded the reference temperature for the previous Fry setting. This is to allow ample time for the sensed utensil temperature to reach the new reference temperature. If there has been no change in mode selection, the program proceeds to Inquiry 370.

Inquiry 370 determines whether the sensed utensil temperature exceeds the utensil removal reference temperature for the Boil Mode at 220° F. (SENOUT>4). If it does, PRC is reset; PHL is set (Block 372), and the program branches (Block 364) to the Removal Out routine (FIG. 16). If SENOUT is not greater than 4, PRC is incremented (Block 374) and Inquiry 376 checks the state of PHL. If set, Inquiry 378 determines whether the time interval during which the sensed utensil temperature has remained less than 220° F. exceeds the reference time of fifteen minutes. If so, PML is set (Block 380) signifying detection of a utensil removal condition and the program branches (Block 364) to the Removal Out routine (FIG. 16).

If PHL is not set, Inquiry 382 determines whether the time interval measured by PRC exceeds the heat up pan removal reference temperature for boil, which in the illustrative embodiment is twenty minutes. If yes, PML is set (Block 380) and the program branches (Block 364) to the Removal Out routine (FIG. 16). If not, the program branches (Block 364) to the Removal Out routine (FIG. 16).

PAN REMOVAL FRY Routine—FIG. 15

This routine is entered from the Fry routine (FIG. 12). Its function is to detect a utensil removal condition when the surface unit is operating in the Fry Mode, by comparing the sensed utensil temperature with the predetermined reference temperature for the selected heat setting in the Fry Mode, and measuring the duration of time intervals during which the sensed utensil temperature is less than the reference temperature to detect such time intervals which exceed the appropriate Fry reference times. As in the other hereinbefore described Pan Removal routines (FIGS. 13 and 14) this routine also resets the PML latch when the OFF setting is selected (KB=0) to return heat setting selection control to the user.

Referring now to the flow diagram (FIG. 15) Inquiry 384 checks for the OFF entry (KB=0). When KB equals zero, the PRC, PHL and PML are reset (Block 386) and the program branches (Block 388) to the Removal Out routine (FIG. 16).

When KB is not zero, Inquiry 390 determines whether the current KB selection represents an increase from the KB selection from the previous pass through the routine by comparing KBL representing the prior KB value with the current KB value. If the current KB is greater than KBL, PHL is reset (392). PHL is reset when the heat setting is increased because each higher setting has a higher pan removal reference temperature. If KB is the same as or less than KBL, no change to PHL is necessary.

Inquiry 394 compares the sensed utensil temperature (SENOUT) with the Fry pan removal reference temperature KB−2. KB−2 is one temperature set point less than the minimum steady state reference temperature (KB−1). Hence, in Fry, if the sensed utensil temperature fails to rise to a temperature greater than (KB−2) within the appropriate predetermined time periods, a pan removal condition will be detected. If SENOUT is greater than (KB−2) the PRC is reset and PHL is set (Block 396) signifying that the reference has been exceeded. If not, PRC is incremented (Block 398).

Inquiry 400 determines the state of PHL to implement the appropriate predetermined reference time. If PHL is set, signifying that the reference temperature has been previously exceeded, Inquiry 402 determines whether the time interval during which the sensed utensil temperature has remained less than the reference exceeds the shorter reference time of ten minutes. If it has, PML is set (Block 404), and the program branches (Block 388) to the Removal Out routine (FIG. 16). If the PRC count represents a time less than ten minutes, the program branches (Block 388) to the Removal Out routine (FIG. 16).

If PHL is not set, indicating surface unit operation in the heat-up phase, Inquiry 406 implements the longer reference time of twenty minutes. If PRC is greater than twenty minutes, a utensil removal condition is detected and PML is set (Block 404), and the program branches (Block 404) to the Removal Out routine (FIG. 16). If PRC is less than twenty minutes, the program branches to the Removal Out routine (FIG. 16).

REMOVAL OUT Routine—FIG. 16

This routine is entered from each of the Pan Removal routines (FIGS. 14-16). Its function is to set the zero power level when the PML is set thereby effecting the de-energization of the heating element upon detection of the utensil removal condition, and to trigger the user discernible signal alerting the user to the detection of a utensil removal condition. In the illustrative embodiment, this signal is an audible tone which is initiated upon detection of a utensil removal condition and continual until the user turns off the surface unit.

Referring now to the flow diagram (FIG. 16), Inquiry 408 checks the state of the PML latch. If set, signifying detection of a utensil removal condition, the OFF or zero power level is set by setting M(KB) to zero (Block 410). This results in de-energization of heating element 12. A trigger signal is output at output port R8 by setting R8 (Block 414) which enables the annunciator. The program then branches (Block 422) to the Power Compare routine (FIG. 17A).

Figure 17A:
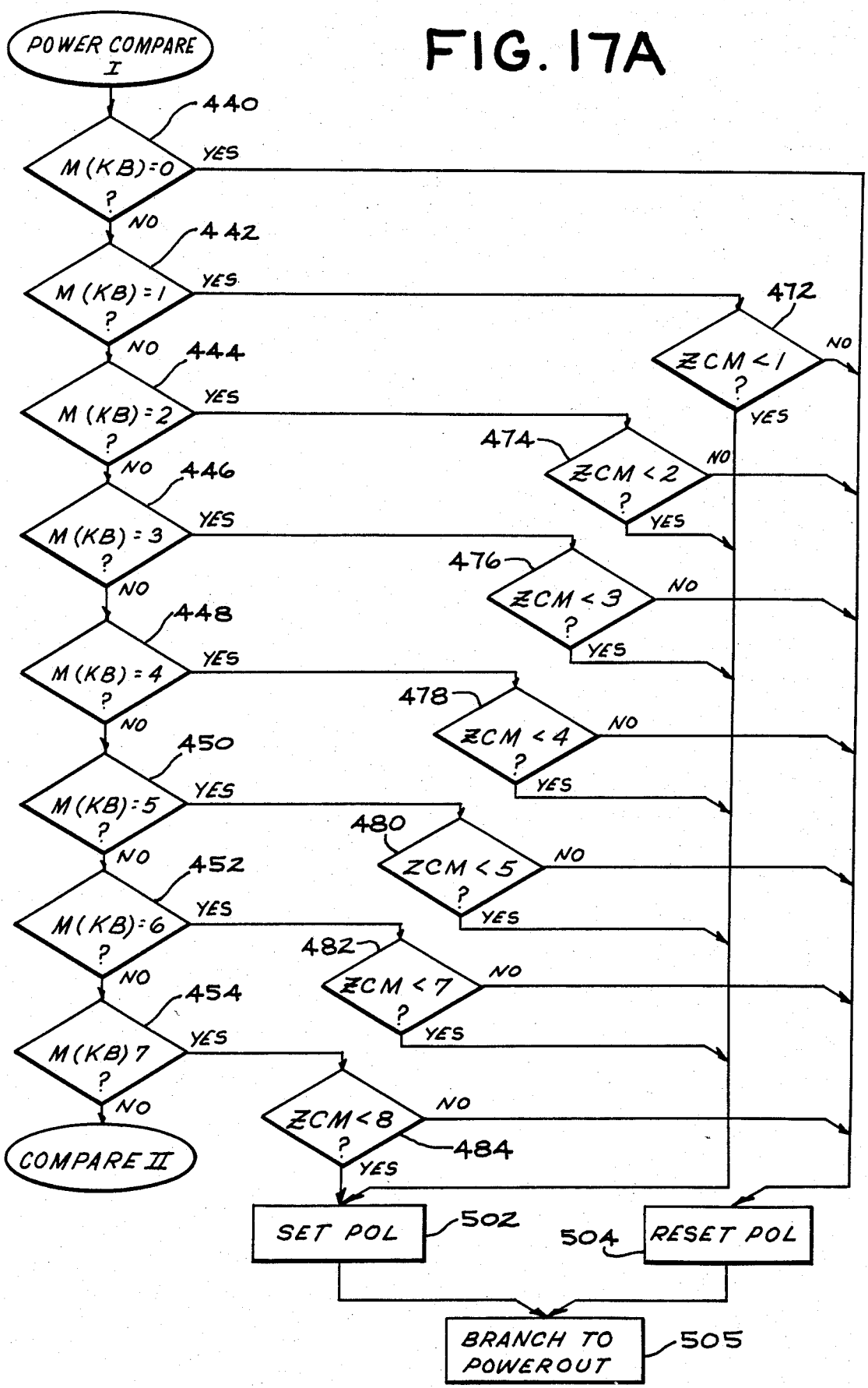
FIGS. 17A and 17B depict the flow diagram of the POWER COMPARE routine incorporated in the control program for the microprocessor in the circuit of FIG. 5.

Returning to Inquiry 408, if PML is reset, R8 is reset (Block 424) and the program branches (Block 422) to the Power Compare routine (FIG. 17A).

Figure 17B:
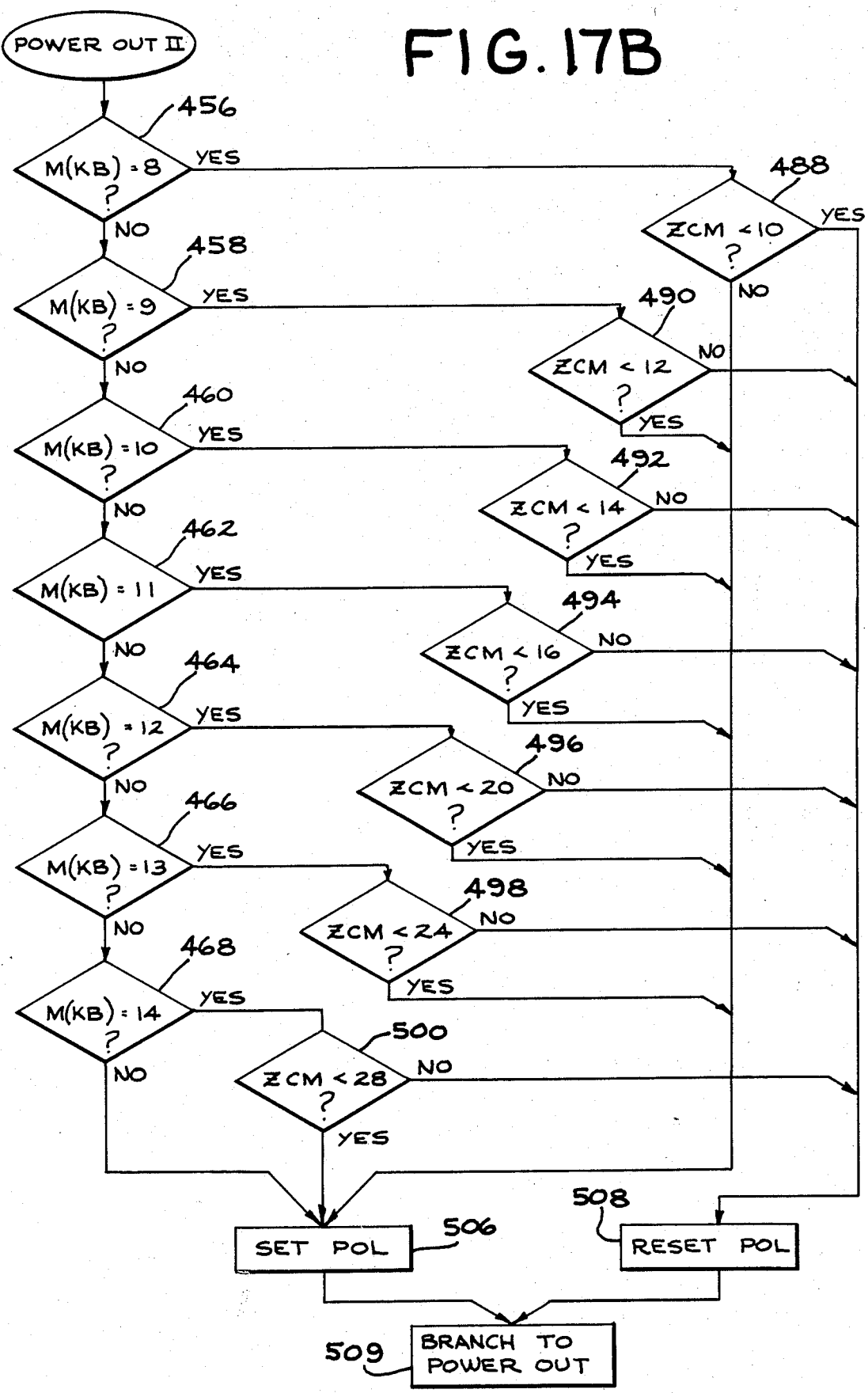

POWER COMPARE Routine—FIGS. 17A and 17B

The function of the Power Compare routine is to determine, based upon the power level designated by M(KB), as determined by the hereinbefore described routines, whether or not the power control triac should be triggered into conduction for the next eight cycle control interval.

It will be recalled that in the illustrative embodiment there are 16 possible power levels including OFF. The % duty cycle for each power level corresponds to the ratio of conductive control intervals to 32, the number of control intervals in the control period. The ZCM counter as hereinbefore described functions as a 32 count ring counter, which is incremented once for each pass through the control program. The power control decision is made by comparing the ZCM count with a reference count associated with the signified power level M(KB). The reference count for each power level represents the number of conductive control intervals per control period corresponding to the desired duty cycle. When the ZCM count is less than the reference, a Power Out Latch (POL) is set, signifying that switching power control triac 106 is to be switched into conduction; otherwise, POL is reset, signifying that power control triac 106 non-conductive.

Referring to FIGS. 17A and B, Inquiries 440-468 determine the value of M(KB). The appropriate one of Inquiries 472-500 corresponding to the identified M(KB) performs the comparison of ZCM to the associated reference count. If ZCM is less than the reference, the Power Out Latch is set by the appropriate one of Blocks 502 and 506, signifying that the heating element 12 is to be energized during the next control interval. Otherwise, the Power Out Latch is reset by the appropriate one of Blocks 504 and 508, signifying that heating element 12 is to be de-energized during the next control interval.

Figure 18:
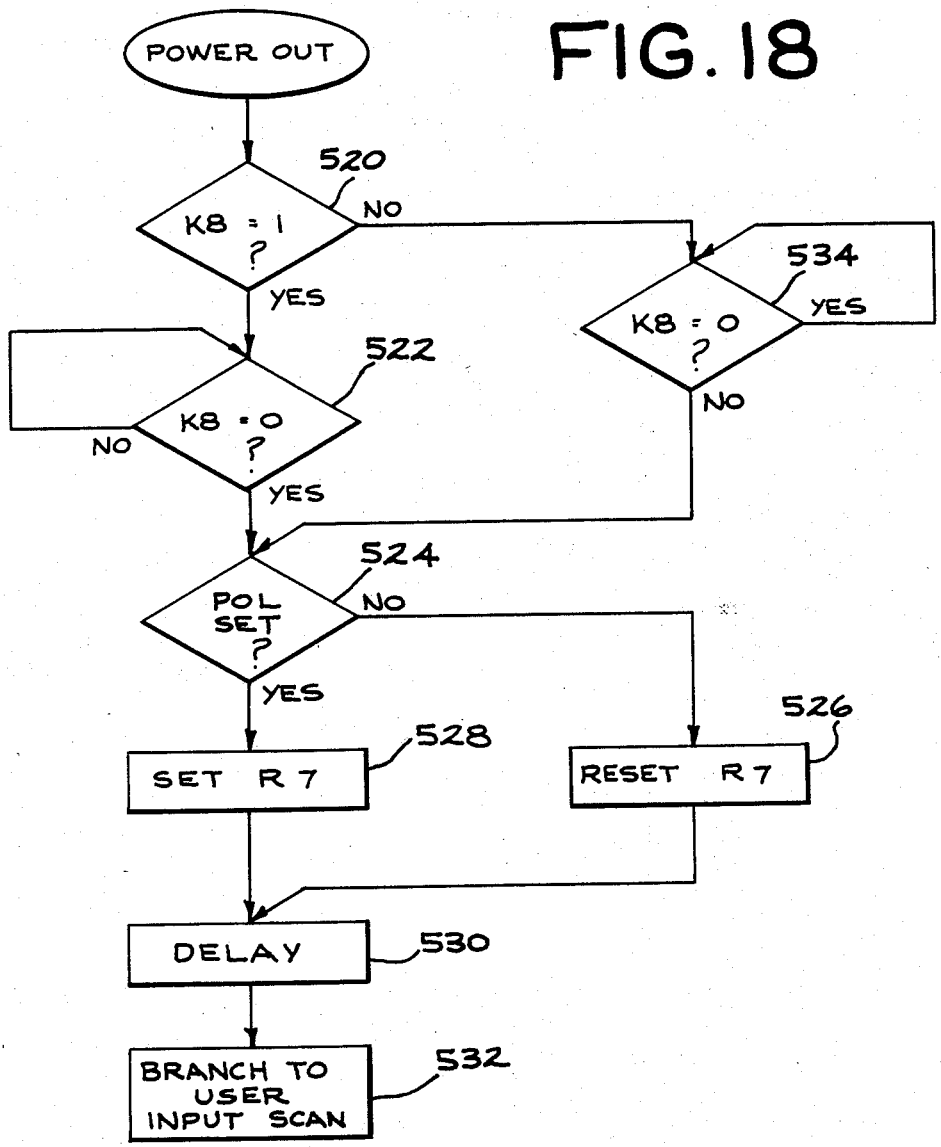
FIG. 18 is a flow diagram of the POWER OUT routine incorporated in the control program of the microprocessor in the circuit of FIG. 5.

Having made the power control decision, the program branches (Block 505 or 509) to the Power Out Routine, FIG. 18.

POWER OUT Routine—FIG. 18

The function of this routine is to await the next zero crossing of the 60 Hz AC power signal applied to the heating element 12 to synchronize firing of power control triac 82 (FIG. 5) with zero-crossings of the power signal.

Input port K8 receives zero crossing pulses from zero crossing detector circuit 100 (FIG. 5). Positive half-cycles are represented by K8=1 and negative half-cycles by K8=0. Inquiry 520 determines the polarity of the present power signal half-cycle. If the signal is presently in a positive half-cycle, (K8=1), Inquiry 522 waits for the beginning of the next negative half-cycle, (K8=0). Upon detection of K8=0, the program proceeds to Inquiry 524. If the answer to Inquiry 520 is NO (K8=0), Inquiry 534 waits for the beginning of the next positive half-cycle (K8=1), then proceeds to Inquiry 524. Inquiry 524 checks the state of the Power Out Latch (POL). If POL is reset, signifying that heating element 12 is not to be energized during the next control interval, R7 is reset (Block 526); if POL is set, signifying heating element 12 is to be energized, R7 is set (Block 528); the program delays (Block 530) and then returns (Block 532) to the User Input Scan Routine (FIG. 6) to repeat the control program for the next control interval.

In the illustrative embodiment the control program is executed in less than one-half cycle. Thus, it is necessary to delay the program for 15 half-cycles before repeating the User Input Scan Routine. In the hereinbefore described program this is done by simply delaying the program for 15 transitions of the input signal at K8. However, it is to be understood that microprocessor could be programmed to perform additional functions such as, for example, controlling the energization of the other three surface units during the time period between executions of the control program for heating unit 12. The other surface units could be similarly equipped with a temperature sensor and controlled by a control program similar to that for element 12. Alternatively, the elements could be controlled in conventional open loop fashion.

While in accordance with the Patent Statutes, a specific embodiment of the present invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A utensil removal detection arrangement for a cooking appliance having at least one surface heating unit for heating a utensil placed thereon, said detection arrangement comprising:
    temperature sensing means for sensing the temperature of a utensil placed on the surface unit;
    means for detecting a sensed utensil temperature greater than a predetermined reference temperature, said reference temperature being greater than the maximum temperature sensed when no utensil is present on said surface unit;
    clock means responsive to said temperature sensing means operative to measure the duration of time intervals during which the sensed utensil temperature is less than said predetermined reference temperature;

means responsive to said clock means for detecting a time interval of duration greater than a predetermined reference duration, said reference duration being sufficient to allow the sensed temperature to reach said reference temperature when a utensil is present on said surface unit; and means operative to de-energize the surface unit upon detection of the occurrence of such a time interval, which occurrence signifies no utensil on said surface unit.

2. The utensil removal detection arrangement of claim 1 further comprising means for generating a user discernible signal upon detection of such a time interval to alert the user to the occurrence of a utensil removal condition.

3. A utensil removal detection arrangement for a cooking appliance having at least one surface heating unit for heating a utensil placed thereon and including user operable switch means for turning the surface unit ON and OFF, said detection arrangement comprising:

temperature sensing means for sensing the temperature of a utensil placed on the surface unit; means responsive to said temperature sensing means operative to detect a utensil temperature greater than a predetermined reference temperature;

latch means responsive to said temperature detection means operative to assume a first state upon the first detection following the turning ON of the surface unit of a utensil temperature greater than said reference temperature and to assume a second state upon the switching OFF of the surface unit;

clock means responsive to said temperature detection means operative to time the duration of time intervals during which the sensed utensil temperature is less than said predetermined reference temperature;

means responsive to said clock means and said latch means, operative to detect time intervals greater than a first predetermined duration when said latch means is in its second state and to detect time intervals greater than a second predetermined duration less than said first predetermined duration when said latch means is in its first state; and means responsive to said time detection means operative to de-energize the heating unit upon detection of such time intervals.

4. The utensil removal detection arrangement of claim 3 further comprising means for generating a user discernible signal alerting the user to the occurrence of a pan removal condition upon detection of such time intervals.

5. A utensil removal detection arrangement for a cooking appliance having at least one surface unit for heating a utensil placed thereon, and user operable input means enabling the user to select a plurality of operating modes and a plurality of heat settings for each mode, including OFF, said pan removal arrangement comprising:

temperature sensing means for sensing the temperature of a utensil placed on the surface unit;

means for detecting a sensed utensil temperature greater than that one of a plurality of predetermined reference temperature associated with the particular selected mode and heat setting;

clock means responsive to said temperature sensing means operative to time the duration of time intervals during which the sensed utensil temperature is less than the predetermined reference temperature for the selected mode and heat setting;

latch means responsive to said temperature means and the user operable input means operative to assume a first state following a change in mode or change to a higher heat setting upon the first detection of a sensed utensil temperature greater than the reference temperature for the newly selected heat setting; and to assume a second state upon a change in setting to a lower setting or selection of the OFF setting;

means responsive to said clock means and said latch means operative to detect a time interval greater than a first predetermined reference time when said latch is in its second state, and to detect a time interval greater than a second predetermined reference time interval when said latch is in its first state, said second predetermined reference time being less than said first predetermined reference time;

and means responsive to said time detection means operative to de-energize the surface unit upon detection of such a time interval.

6. The utensil removal detection arrangement of claim 5 wherein the user selectable modes include a Boil Mode and a Fry Mode and wherein said time interval detecting means is further operative when said latch is in its second state to detect a time interval greater than said first predetermined reference time interval in response to selection of the Fry Mode, and to detect a time interval greater than a third reference time in response to selection of the Boil Mode, said third reference time being longer than said first reference time.

7. In a cooking appliance having at least one surface unit for heating a utensil placed thereon, user operable input selection means enabling the user to select from a plurality of operating modes including Boil and Fry Modes and a plurality of heat settings for each mode, including OFF, each heat setting for each mode having associated with it a predetermined minimum steady state reference temperature, a utensil removal detection arrangement comprising:

temperature sensing means for sensing the temperature of a utensil placed on the surface unit;

means for detecting a sensed utensil temperature greater than the predetermined reference temperature associated with the selected mode and heat setting;

clock means responsive to said temperature detecting means operative to measure the duration of time intervals during which the sensed utensil temperature is less than said predetermined reference temperature for the selected mode and heat setting;

latch means responsive to said temperature detection means and the input selection means, operative to assume a first state upon the first occurrence of a sensed utensil temperature greater than said associated reference temperature following a change in heat setting from a lower heat setting to a higher heat setting and to assume a second state upon a change from a higher setting to a lower setting;

means responsive to said clock means and said latch means operative when said latch means is in its first state to de-energize the heating element when the sensed utensil temperature remains less than said associated reference temperature for a time interval greater than a first predetermined reference time, and operative when said latch means is in its second state to de-energize the heating element when the sensed utensil temperature remains less than said associated reference temperature for a second predetermined reference time, said second reference time being less than said first reference time.

8. The utensil removal detection arrangement of claim 7 further comprising indicator means operative when triggered to provide a user discernible signal to alert the user to the occurrence of a utensil removal condition; and wherein said means operative to de-energize the surface unit is further operative to trigger said indicator means when de-energizing the surface unit.

* * * * *